(12) United States Patent
Raphaeli et al.

(10) Patent No.: US 10,084,631 B2
(45) Date of Patent: Sep. 25, 2018

(54) TECHNIQUE FOR PAPR REDUCTION IN COMMUNICATION CHANNEL

(71) Applicant: Ramot at Tel-Aviv University Ltd., Tel Aviv (IL)

(72) Inventors: Dan Raphaeli, Kfar-Saba (IL); Yonathan Tate, Kfar Saba (IL); Or Levi, Kiryat Ono (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 0 days.

(21) Appl. No.: 15/615,288

(22) Filed: Jun. 6, 2017

(65) Prior Publication Data

US 2017/0353340 A1    Dec. 7, 2017

Related U.S. Application Data

(60) Provisional application No. 62/346,058, filed on Jun. 6, 2016.

(51) Int. Cl.
| | |
|---|---|
| *H04L 5/12* | (2006.01) |
| *H04L 23/02* | (2006.01) |
| *H04L 27/26* | (2006.01) |
| *H04L 5/00* | (2006.01) |
| *H04L 1/00* | (2006.01) |

(52) U.S. Cl.
CPC ........ *H04L 27/2623* (2013.01); *H04L 5/0053* (2013.01); *H04L 1/002* (2013.01)

(58) Field of Classification Search
CPC ... H04L 27/2623; H04L 5/0053; H04L 1/002; H04L 27/366; H04L 1/0043; H03M 13/258

USPC ......................................... 375/261, 264, 265
See application file for complete search history.

(56) References Cited

U.S. PATENT DOCUMENTS

| | | | | |
|---|---|---|---|---|
| 5,621,762 | A * | 4/1997 | Miller | H04L 27/366 332/103 |
| 7,151,804 | B2 * | 12/2006 | Tong | H03M 13/258 375/260 |
| 2007/0098094 | A1 * | 5/2007 | Yue | H04L 1/0043 375/260 |

OTHER PUBLICATIONS

Rha et al., "Peak-to-average ratio (PAR) reduction by pulse shaping using a new family of generalized raised cosine filters", IEEE 58th Vehicular Technology Conference, vol. 1, pp. 706-710 (2003).
Li, et al., "A Novel Constellation Reshaping Method for PAPR Reduction of OFDM Signals", IEEE Transactions on Signal Processing, vol. 59, No. 6, pp. 2710-2719 (Jun. 2011).

(Continued)

*Primary Examiner* — Phuong Phu
(74) *Attorney, Agent, or Firm* — Browdy and Neimark, PLLC

(57) ABSTRACT

A technique of mapping data, suitable for Peak to Average Power Ratio (PAPR) reduction while transmitting data portions via a communication channel limited by a peak power $p_{peak}$. The mapping is performed by utilizing a Markovian symbol transition probability distribution with quantized probabilities and by selecting, for a specific data portion at a current channel state, such a binary symbol (called thinned label) which allows puncturing one or more bits in the thinned label's bit sequence before transmission.

21 Claims, 9 Drawing Sheets

(56) References Cited

OTHER PUBLICATIONS

Qu et al., "Invertible Subset LDPC Code for PAPR Reduction in OFDM Systems With Low Complexity. IEEE Transactions on Wireless Communications", IEEE Transactions on Wireless Communications, vol. 13, No. 4, pp. 2204-2213 (Apr. 2014).

Chatelain et al.,"Peak-to-average power ratio and intersymbol interference reduction by Nyquist pulse optimiza-tion", IEEE 60th Vehicular Technology Conference, vol. 2, pp. 954-958 (2004).

Miller et al., "Peak power and bandwidth efficient linear modulation", IEEE Transactions on Communica-tions, vol. 46, No. 12, pp. 1639-1648 (1998).

Tomlinson et al., "Power and bandwidth efficient modulation and coding for small satellite communication terminals", IEEE International Conference on Communications, vol. 5, pp. 2943-2946 (2002).

Tomlinson., "Magnitude modulation for small satellite Earth terminals using QPSK and OQPSK", IEEE International Conference on Communications, vol. 3, pp. 2099-2103 (2003).

Gomes et al., "Polyphase magnitude modulation for peak power control", 17th European Signal Processing Conference, pp. 1151-1155 (2009).

Gomes et al., "Magnitude modulation for VSAT's low back-off transmission", Journal of Communications and Networks, vol. 12, No. 6, pp. 544-557 (2010).

Chen et al., "Trellis pruning for peak-to-average power ratio reduction", International Symposium on Information Theory, 2005. ISIT 2005., pp. 1261-1265 (2005).

Forney Jr., "Trellis Shaping", IEEE Trans. Inf. Theory, vol. 38, No. 2, pp. 281-300 (Mar. 1992).

Litzenburger et al., "Combined trellis shaping and coding to control the envelope of a bandlimited PSK-signal", IEEE International Conference on Communications, pp. 630-634 (Mar. 1994).

Tanahashi et al., "Near constant envelope trellis shaping for PSK signaling", IEEE Transactions on Communi-cations, vol. 57, No. 2, pp. 450-458 (2009).

Tanahashi et al., "Trellis Shaping for Controlling Envelope of Single-Carrier High-Order QAM Signals", IEEE Journal of Selected Topics in Signal Processing, vol. 3, No. 3, pp. 430-437 (2009).

Fischer et al., "Dynamics limited precoding, shaping, and blind equalization for fast digital transmission over twisted pair lines", IEEE Journal of Selected Areas in Communications, vol. 13, No. 9, pp. 1622-1633 (1995).

Fischer et al., "Signal shaping for peak-power and dynamics reduction in transmission schemes employing precoding", IEEE Transactions in Communications, vol. 50, No. 5, pp. 735-741 (2002).

Tanahashi et al., "Turbo decoding of concatenated channel coding and trellis shaping for peak power controlled single-carrier systems", IEEE Transactions on Communications, vol. 58, pp. 9-15 (Jan. 2010).

Shilpa et al., "Dirty paper coding using sign-bit shaping and LDPC codes", Proceedings (ISIT), 2010 IEEE International Symposium on Information Theory, pp. 923-927 (Jun. 2010).

Csiszar et al., "Conditional limit theorems under Markov conditioning", IEEE Transactions on Information Theory, vol. 33, pp. 788-801 (Nov. 1987).

Arnold et al., "Simulation-Based Computation of Information Rates for Channels with Memory", IEEE Transactions on information theory, vol. 52, pp. 3498-3508 (Aug. 2006).

Raphaeli et al., "Constellation Shaping for Pragmatic Turbo-Coded Modulation With High Spectral Efficiency", IEEE Trans. Commun., vol. 52, pp. 341-345 (Mar. 2004).

Bahl et al.,"Optimal decoding of linear codes for minimizing symbol error rate", IEEE Transactions on Information Theory, 284-287 (Mar. 1974).

Franz et al., "Concatenated decoding with a reduced-search BCJR algorithm", IEEE Journal on Selected Areas in Communications, vol. 16, No. 2, pp. 186-195 (1998).

Le Goff et al.,"Turbo codes and high-efficiency modulation", Proc. IEEE Int. Conf.Communications, New Orleans, LA, pp. 645-649 (May 1994).

Berrou et al., "Near-optimum error-correcting coding and decoding: Turbo codes", IEEE Trans. Commun., vol. 44, pp. 1261-1271 (Oct. 1996).

Benedetto et al., "A search for good convolutional codes to be used in the construction of turbo codes", IEEE Trans. Commun., vol. 46, pp. 1101-1105 (Sep. 1998).

\* cited by examiner

TECHNIQUE FOR PAPR REDUCTION IN COMMUNICATION CHANNEL

FIELD OF THE INVENTION

The present invention relates to a technique for reducing Peak to Average Power Ratio (PAPR) in communication lines/channels. The technique comprises a way of mapping data to achieve shaping criteria when using a Markovian signal modulation in single or multi carrier communication systems.

BACKGROUND OF THE INVENTION

In practical communication systems power amplifiers (PA) are commonly used to enable wireless transmission over long distances. When using such a PA, it is crucial to keep the input signal's power within the PA's linear region in order to avoid saturation of the transmitted signal, which leads to both in-band and out-band disturbances. Transmission signals at the PA input are therefore backed-off (BO) so that instantaneous high peak power values will not cause saturation. The cost of the BO is that the average power of the signal is lower, thus compromising the transmission rate. This effect is especially severe in transmission signals with wide dynamic range, such as OFDM. However, in band limited single carrier transmission, which is common in satellite communication systems, high Peak to Average Power Ratio (PAPR) is also common. The PAPR problem in satellite communication is significant due to the high cost of PA, and due to the limited satellite resources where even 1 dB loss is critical.

Since the length of the pulse shape exceeds the symbol duration, high instantaneous peak power values are the result of certain symbol sequences. A possible approach to reduce the PAPR is therefore to try to avoid such sequences.

For example, the method of Trellis shaping (TS), first suggested by Forney to reduce the average transmission power in high orders constellation signaling [1], has been shown to be useful for the purpose of PAPR reduction as well [2]. Originally, TS was shown to work well with Trellis Coded Modulation (TCM) [1]. Several attempts have been made to combine TS with other ECC schemes [3] [5]. In [5], LDPC code as inner code was combined with TS for power reduction. In [3] TS for PAPR reduction was combined with convolutional ECC. The reported gain in [3] was 1.8 dB PAPR gain with 1.5 dB loss in SNR, resulting in an overall link gain of 0.3 dB. However, the SNR loss was calculated theoretically and may be higher in practical schemes. Additionally, the information rate was 1 bit/symbol, and higher rates were not investigated.

TS is based on adding shaping bits, usually one bit per symbol, to create redundancy in the possible symbol sequences representing a given information word, and a Viterbi decoder which is used to select the symbol sequence with the minimal PAPR cost. Although PAPR gain can be achieved in this way, several issues are not fully addressed by PAPR reduction using TS. First, TS adds an integer number of bits per symbol, which does not allow a complete rate/shaping trade-off. Second, it is not clear whether the PAPR reduction achieved by TS for a given rate is optimal. And third, the combination of TS with modern error correcting codes (ECC) such as Turbo codes or LDPC, which is crucial for enabling a reliable communication system, has not been optimized, leading to lower gain.

In [4] a different approach is presented, in which certain symbol sequences that result in high PAPR, are simply forbidden by the transmitter. This constraint imposes a Markovian distribution on the transmission with a flexible rate to PAPR reduction trade-off, and is shown to theoretically achieve good PAPR reduction with low rate loss. A previous work by the authors [9] was an attempt to obtain a power reduction gain by trying to apply another distribution on transmission, with different probabilities of using certain symbol sequences.

OBJECT AND SUMMARY OF THE INVENTION

It is therefore the object of the invention to propose a technique (a method, a system, a mapper and a software product) which would significantly improve the previously known PAPR reduction methods and systems.

The Inventors propose a mapping method suitable for Peak to Average Power Ratio (PAPR) reduction while transmitting data portions (tuples) via a communication channel limited by a peak power $p_{peak}$, the mapping being performed by a data mapper configured to utilize a Markovian symbol transition probability distribution with quantized probabilities and to select, for a specific data portion at a current channel state, such a binary symbol, called "thinned label", that would reduce $p_{peak}$ by allowing to puncture/omit one or more bits (so called non-transmittable or omittable bits) in its bit sequence before transmission.

It goes without saying that puncturing of said one or more bits before transmission does not prevent further demapping of the transmitted thinned label, and that demapping of the transmitted thinned label supposes using the same Markovian distribution, and usually using also Error Correction Codes applied to add parity bits to information bits of the data portions before mapping thereof.

The higher the probability assigned to the selected symbol (or a selected thinned label), the greater may be the number of non-transmittable (omittable) bits, still not preventing demapping (decoding) of the transmitted Thinned label.

The mapping of the data portions (tuples) into symbols can be implemented by using a channel-state dependent mapping table comprising, for each current channel state, quantized values of probabilities of the current channel state to become $s_k$, given that the current state is $s_{k-1}$.

The mapping may comprise successively mapping the data portions, by the mapper, into binary symbols in a manner that a current binary symbol depends on a current channel state and that the use of binary symbols supposed to produce peak values exceeding $p_{peak}$ is avoided, the mapping being based on the Markovian symbol distribution with a constraint $p_{peak}$, providing that each binary symbol is expected to be used with its specific transition probability at the current channel state, wherein the Markovian symbol distribution is quantized by forming at least one group of close transition probabilities and assigning to each of said groups a common symbol and a rounded group probability, thus obtaining a non-uniform symbol distribution where the binary symbols including said at least one common symbol are expected to be used with different transition probabilities;

and wherein said common symbol, in each of said groups, is replaced with said "thinned label" being a binary symbol comprising non-transmittable bits;

the mapping thereby ensuring reduction of a peak value produced by said binary symbols, including said at least one thinned labels, whenever selected for transmission.

In operation, the mapping may terminate with selecting, for a current data portion, a binary symbol or a thinned label assigned to the highest transition probability for a current channel state.

It should be noted that all transition probabilities assigned for the current channel state form 1 in sum. For example, each of them may be quantized to $2^{-b}$, where b is a natural number of passing bits (i.e., non-omittable bits) of the selected symbol for said specific probability.

Upon performing the mapping of a current data portion, the method comprises updating the current channel state by the selected symbol.

The current channel state may comprise (e.g., may be formed by) a number of consequently transmitted previous symbols terminating with the last transmitted symbol. For example, the channel state may constitute just one last transmitted symbol.

The non-transmittable bits of the label may be called erasable, omittable, puncturable, droppable or "does not care" bits; such bits and are not intended to be transmitted by a transmitter, they replace correspondingly positioned bits ("0" or "1") in the symbol/s of the group.

Any of the mentioned binary symbols (including the thinned label) has its specific bit sequence comprising "0" and/or "1" bits. The thinned label also comprises non-transmittable bits which do not carry any value in transmission.

Preferably, said at least one group is the group of higher transition probabilities. The proposed quantizing and labeling, performed upon applying the Markovian symbol distribution with peak constraint, allow obtaining the non-uniform symbol distribution by judiciously increasing transition probabilities for such symbols which produce lower peak values (and thus have higher transition probabilities according to the Markov distribution), and by transmitting there-instead a "thinned" label, thus contributing to the PAPR reduction.

The mapping may comprise building a mapping table (online or in advance) for a current channel state by:
  applying a Markov model to possible binary combinations of the data portions at the current data state, to obtain the Markovian distribution of the binary symbols and their transition probabilities with constraint $p_{peak}$, thereby addressing said binary combinations by assigning to them symbols with transition probabilities in the manner that the symbols producing lower peak values have higher transition probabilities, while the symbols producing higher peak values have lower transition probabilities,
  quantizing the Markovian distribution by grouping the obtained transition probabilities by value so as to form at least one group of higher transition probabilities comprising two or more members, and assigning to each of said groups a specific common symbol and a specific rounded probability of the group,
  selecting for each of said groups, said thinned label for replacing (labeling) said specific common symbol, said thinned label being close to the binary combinations addressed by said group but producing a peak value equal to or lower than any of said binary combinations.

The mentioned transition probability of a specific symbol should be understood as a probability of a specific current state of the communication channel to be changed so as to comprise (or so as to become equal to) that specific symbol.

On the other hand, the term "transition probability" may be understood as "transmission probability" i.e., probability of transmission of a specific symbol at a specific current state, according to the present method based on the Markov model with peak constraint.

All symbols with bit sequences producing peak values not exceeding $p_{peak}$ may be called "possible symbols".

The symbols producing higher peak values should be understood as possible symbols having such respective bit sequences which, if transmitted, would produce peak values relatively close to but not exceeding the $p_{peak}$.

The symbols producing lower peak values should be understood as possible symbols having such respective bit sequences which, if transmitted, would produce peak values lower than $p_{peak}$.

It goes without saying that different groups of transition probabilities may be formed, and different thinned labels may be respectively assigned to the groups.

The steps of quantizing and labeling allow significantly reducing the total volume of the mapping tables.

The mapping may be terminated by selecting, for transmission, the thinned label assigned in the mapping table to the group with the highest group probability for the current channel state.

Each specific mapping table may be thus significantly reduced in size, especially when the lower probabilities are also grouped or neglected.

The mapping method may form part of a low PAPR transmission process.

Upon the mapping and during the transmission, the thinned label(s), selected for specific data portion(s), are then transmitted by a transmitter upon puncturing (erasing, omitting) of non-transmittable bits thereof by a puncturing unit, thereby reducing the peak value produced in the transmission and thus contributing to PAPR reduction.

The quantizing (grouping) may be performed by presenting the transition probabilities in the form $2^{-b}$, and by quantizing the Markovian probabilities by rounding them to groups of $2^{-b}$ (b is a natural number, for example, b=0, 1, 2 . . . ).

The number "b" is the number of transmittable bits in the thinned label (i.e., b relates to bits passed to the transmission after the proposed puncturing). The number "b" may be a number of information bits in a binary combination of the data portion.

Preferably, the mapping/labeling may satisfy at least one of the following conditions:
  For each channel state, mapping of the symbols should be as close to Grey mapping as possible;
  For neighbor channel states (the states which differ by one symbol), the mapping should be as close as possible.

The practical mapping algorithms may be called bit-labeling algorithms, such algorithms may differ by ways of constructing the mapping tables and by ways of selecting the non-transmittable bits.

For example, error-correcting (parity) bits in a data portion may be selected to become non-transmittable bits in the label.

In another example, the mapping according to the current channel may be performed depending on the type of bits (information or parity bits) in the data portion and/or on the type of a symbol (forbidden or not).

The method may then comprise de-mapping of the transmitted symbol/label at a receiver end of the communication channel, using a de-mapper capable of applying the Markovian model and capable of recovering the binary value of the non-transmitted (punctured bits) based on the quantizing and labeling method used in the mapper, so as to arrive to the mapped data portion.

The mentioned communication channel may be, for example, a single carrier communication channel which provides high spectral efficiency with the proposed PAPR reducing technique.

The mentioned data portions usually comprise information bits and error-correction bits (redundancy, parity bits) added to the information bits. The data portion may be a code word or a fragment (a tuple) of the code word.

In view of the above, the method may comprise at least one of the following preliminary steps:
- adding error correction redundancy/parity bits to information bits, thereby creating at least one code word,
- dividing information bits (or the code words) into shorter data portions (tuples), each portion having its specific binary combination.

The tuples then may be sequentially mapped into symbols using a set of channel-state dependent mapping tables, and the current channel state is updated with each newly selected symbol and the process is repeated with the next tuple.

The above-described method may be considered a method of shaping, wherein the main shaping constraint is $p_{peak}$.

The method may comprise choosing different values of $p_{peak}$ to be avoided, for obtaining different combinations of SNR loss and PAPR gain.

According to a further aspect of the invention, there is also proposed a system for mapping data portions for transmission via a communication channel with a peak constraint, the system comprises at least a mapper disclosed below.

According to yet a further aspect, there is provided a mapper suitable for mapping data portions to be transmitted via a communication channel limited by a peak power $p_{peak}$,
- the mapper being configured to utilize a Markovian symbol transition probability distribution with quantized probabilities;
- the mapper being adapted to select, for a specific data portion at a current channel state, a binary symbol called "thinned label" supposed to reduce $p_{peak}$ by allowing to puncture/omit one or more bits in the thinned label's bit sequence before transmission.

The Markovian distribution may be a Markovian symbol distribution with peak constraint. The mapper may be further adapted to select said thinned label for the maximal transition probability quantized for the specific data portion in the symbol transition probability distribution at the current channel state. The mapper may be configured to update the current channel state upon mapping a current data portion. The mapper may work based on mapping tables and/or or online.

The system may further comprise a bit puncturing device at a transmitter side of the communication channel. Other modules which may be placed at the transmitter side will be briefly mentioned in the detailed description.

The system may comprise a transmitter capable of shaping for Peak to Average Power Ratio (PAPR) reduction in a single carrier communication channel limited by a peak power $p_{peak}$, the transmitted comprises at least:
- an ECC encoder adding error correction redundancy bits to information bits, for further obtaining the data portions,
- the mapper as above, for applying Markov model while mapping of the data portions into symbols depending on a current channel state,
- a bit puncturing device for puncturing bits in some of the symbols thus avoiding bit sequences in the symbols with peak values exceeding $p_{peak}$, wherein said transmitter being adapted to update the current channel state upon mapping of a current data portion.

The transmitter may further comprise a multiplexer, a bit interleaver, a preliminary bit puncturer placed before the bit interleaver and the mapper.

The transmitter, for example, may be adapted for transmission at rate of 3 bits/symbol over a 16-QAM constellation, with an SRRC filter with roll-off factor 0.1, $K_S=4$ and $N_S=8$, so that the transmitter's maximal link gain is expected for peak constraint $p_{peak}$ of about 2.2.

The transmitter may be adapted to regulate values of $p_{peak}$ for obtaining different combinations of SNR loss and PAPR gain.

The system may further comprise a de-mapper at a receiver side of the communication channel, suitable for demapping/decoding the signal transmitted/shaped by the transmitter. The de-mapper is supposed to utilize in its operation the same Markov model with the same constraint, and the same ECC whenever applied at the transmitter side of the communication channel.

According to yet a further aspect of the invention, there is provided a demapper for de-mapping data portions received via a communication channel limited by a peak power $p_{peak}$, the demapper being configured to restore data portions mapped by a mapper and transmitted via said communication channel upon omitting one or more bits, wherein said mapper being configured:
- to map data portions to be transmitted via said communication channel limited by the peak power $p_{peak}$,
- to utilize a Markovian symbol transition probability distribution with quantized probabilities, and
- to select, for a specific data portion at a current channel state, a binary symbol called "thinned label" supposed to reduce $p_{peak}$ by allowing to puncture/omit one or more bits in the thinned label's bit sequence before transmission.

There is also provided a software product comprising computer implementable instructions and/or data for carrying out at least a part of the described method(s), stored on an appropriate non-transitory computer readable storage medium so that the software is capable of enabling operations of said method when used in a computer system.

For example, the proposed software product may enable preliminarily building of the mapping table/s per any channel state, to be used for further mapping the data portions online.

BRIEF DESCRIPTION OF THE DRAWINGS

The invention will be further described with reference to the following non-limiting drawings, in which.

DETAILED DESCRIPTION OF SPECIFIC EMBODIMENTS

Figure 1A:
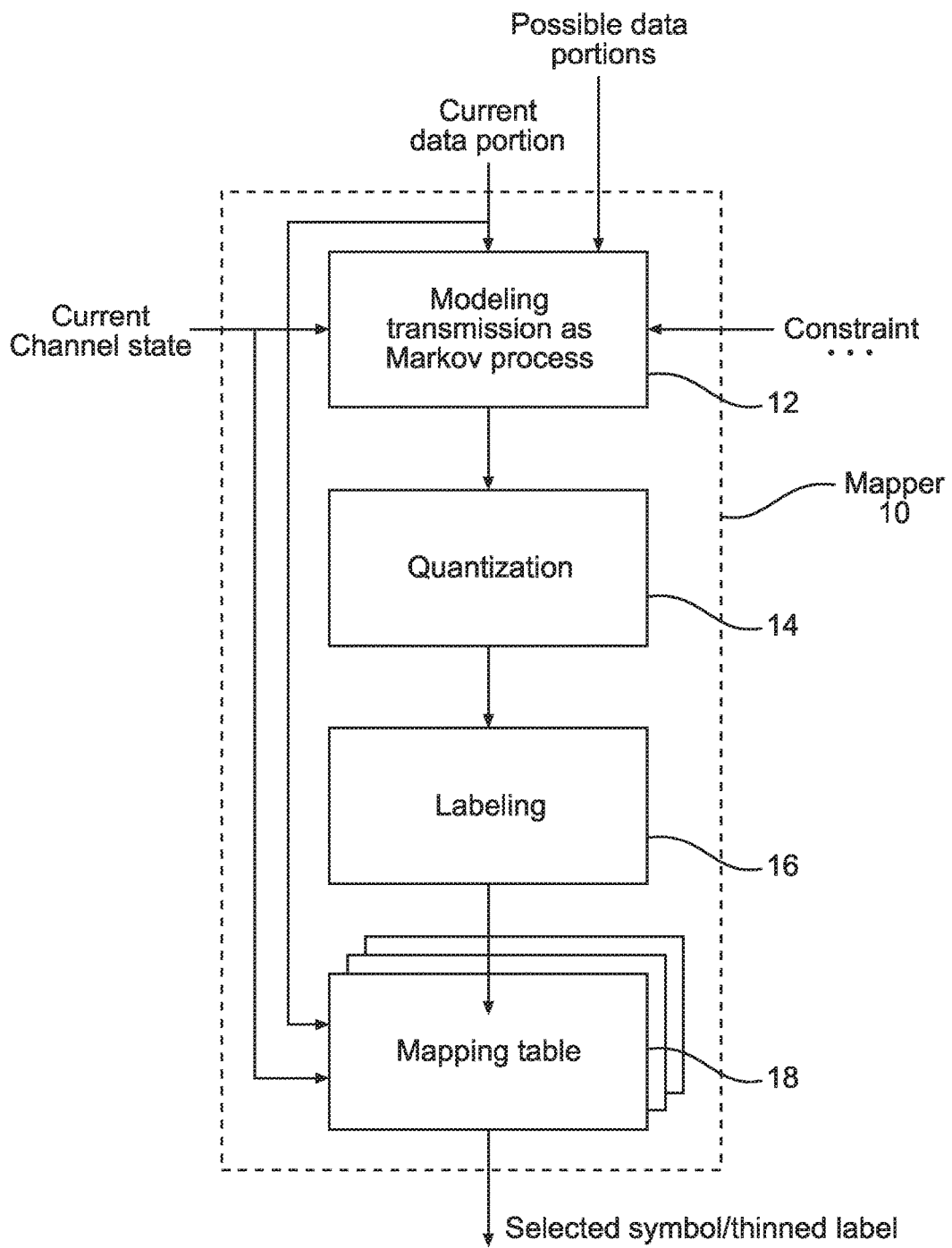
FIG. 1A—is a simplified flow-chart of the proposed mapping method, which also serves a block diagram of a mapper suitable for low PAPR transmission.

The mapping approaches known in the prior art are therefore enhanced and significantly improved by the proposed technique schematically illustrated in FIG. 1A.

A mapper 10 receives data portions, it is aware about a current channel state and about a constraint (for example, peak constraint $p_{peak}$ for obtaining the desired PAPR). The mapper 10 may build each mapping table (18) in advance, for possible data portions if arrive at a specific channel state. A current data portion may be mapped using the mapping table 18, or online. The Mapper 10 comprises block 12 designed for applying a Markovian model to the transmitted data signal. Based on the mentioned input, block 12 produces a Markovian symbol-probabilities distribution which requires a huge number of mapping tables and cannot provide specific desired shaping of the signal. For finding the desired/optimal distribution rigorously, the method comprises creating a non-uniform symbol distribution by quantizing (block 14) and then by labeling (block 16) the distribution produced by block 12. The quantizing may be by presenting probabilities as $2^{-b}$, with further grouping and rounding probabilities of the groups. The labeling (16) may comprise assigning to quantized groups of probabilities so-called thinned labels comprising non-transmittable bits (for example, error correction bits), thus obtaining a mapping table (18) for the current channel state. As a result, a reduced number of mapping tables can be obtained for possible channel states, and some of the remaining tables may be essentially shortened.

In one practical implementation, a shaping system comprises a transmitter which is provided with a mapper similar to 10, for mapping/shaping incoming data portions according to the proposed method. The shaping system, upon selecting by the mapper of such a thinned label for transmission, applies puncturing of the non-transmittable bits thus achieving in practice the desired Markovian symbol transmission probability distribution which ensures avoiding symbols and symbol sequences with high peak values. The extended system also comprises any ECC scheme, filters, a communication channel (line) and comprises a suitable decoder (de-mapper) at its receiving end. The ECC scheme may, for example, be based on Turbo codes, but it is not obligatory. Examples of the extended system will be shown in FIGS. 6 and 7.

Figure 1B:
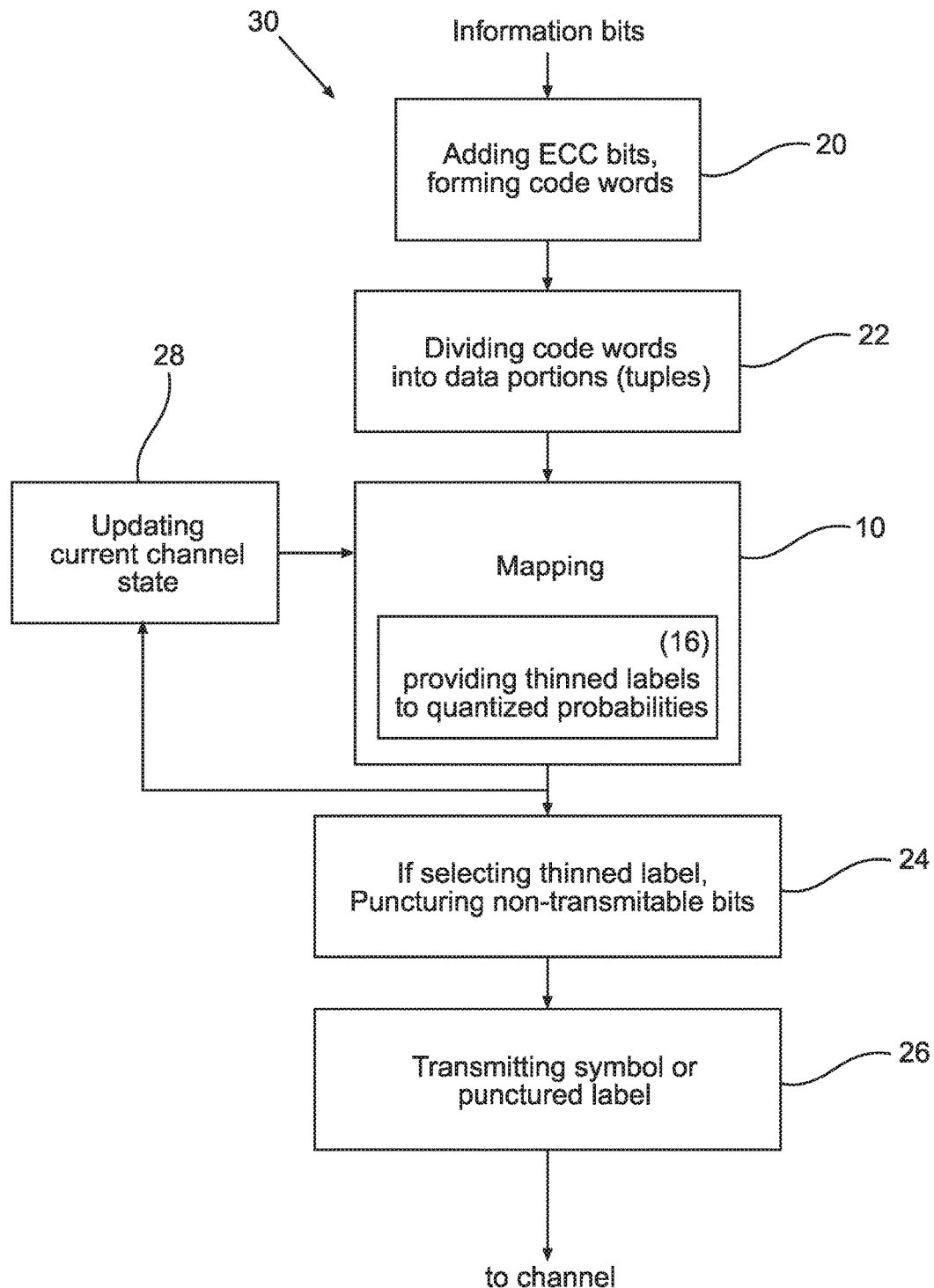
FIG. 1B—is a simplified flow-chart of the proposed transmitting/shaping method, which also serves a block diagram of a transmitter suitable for low PAPR transmission.

FIG. 1B shows that a practical transmitter (30) may operate according to the following order of operations:

For shaping a signal to obtain Peak to Average Power Ratio (PAPR) reduction while transmitting given information bits via a communication channel limited by a peak power $p_{peak}$:

adding error correction redundancy bits to the given information bits (block 20) thereby creating a code word, dividing the code word into shorter tuples (block 22);

applying a modified (i.e., quantized) Markov model for online mapping (i.e., bit labeling) of the tuples into symbols depending on a current channel state, so that each symbol is transmitted with a different probability for a given channel state, while replacing some of the symbols with thinned labels (mapper block 10 with block 16 there-inside)

if a thinned label has been selected as a result of mapping, puncturing/omitting some of bits (actually, omitting of some of the error correction redundancy bits or information bits) in the thinned labels (Block 24), thus avoiding symbol sequences with peak values exceeding $p_{peak}$ and reducing probability of symbols approaching to $p_{peak}$;

according to the mapping, transmitting a symbol or a thinned label (block 26)

upon performing the mapping of a current tuple (or later, but anyway before a new cycle of mapping), updating the current channel state for mapping of a next tuple.

The proposed system has been shown to perform well, compared to a non-shaped system, which will be demonstrated by further FIGS. 5, 8-12.

The technique can be used to improve any communication link limited by the PA peak power. It is in particular attractive to satellite communications by maximizing the rate of a given transponder, or given terminal hardware.

Before describing practical results and implementations, some theoretical terms and notations should be introduced.

System Model

Let C be a 2-dimensional constellation with cardinality $|C|=M$. Let $c=(c_0, \ldots, c_{N-1})$, where $c_i \in C$, be a frame of N symbols transmitted over an AWGN channel. The transmission sequence c is up-sampled and passed through an over-sampled RRC pulse shape filter $h[n]$ with effective duration spanning over $K_s$ symbols. The resulting sampled casual transmission signal $x[n]$ is given by $$x[n] = \sum_{m=0}^{NN_s-1} c_m h[n - mN_s] \qquad (1)$$

where $N_s$ is the number of samples taken in a symbol period T.

The instantaneous power of the signal is given by $p[n] = |x[n]|^2$. The PAPR is the ratio between the peak and the average values of $p[n]$, where the peak value is defined as the value of $p[n]$ which is exceeded with probability $P_{peak}$. In this paper we use the values $P_{peak}=10^{-4}$ and $N_s=8$. Additionally, constellation points are normalized so that the average uniform power is 1.

When shaping for PAPR reduction is applied, in addition to any PAPR gain an additional gain (usually negative, i.e. loss) in BER performance may occur. This change in BER performance, is caused mainly due to the reduction in the mutual information, which caused by the shaping transmission. To accommodate for this effect, the overall gain of a shaped system must take into account any gain in BER performance. Since any reduction in PAPR allows for an equivalent increase of average power, the overall gain of a shaped system is therefore the sum of the PAPR gain and the (negative) gain in BER performance, either theoretical or practical. This gain is denoted from here on as "link gain".

Markovian Symbol Distribution with Peak Constraint

A. Maximal Entropy Symbol Distribution

A channel state at time k, denoted $s_k$, is defined as the length $K_s-1$ symbols sequence $(c_{k-K_s+1}, \ldots, c_{k-1})$. The combination of a channel state and a symbol $c_k$ determines both $N_s$ samples of p[n] and the next channel state $s_{k+1}$. Ideally, the desired transmitted symbol distribution is the distribution which maximizes the link gain for a given information rate. Since such distribution is hard to find analytically, instead we investigate distributions which have maximal entropy rate under peak power constraint.

Consider a peak constraint $p[n] < p_{peak}$ on the signal's power samples and let P* be the symbols distribution with maximal entropy rate out of all distributions meeting the constraint. P* can be derived analytically using the method shown in [19]. Specifically, if W $(s_k|s_{k-1})$ is the Markov representation of the uniform transmission, given by $$W(s_k | s_{k-1}) = \begin{cases} 1/M & \text{if } (s_k, s_{k-1}) \in E_0 \\ 0 & \text{if } (s_k, s_{k-1}) \notin E_0 \end{cases} \quad (2)$$

where $E_0$ is the set of all $(s_{k-1}, s_k)$ combinations of consecutive channel states, then, according to theorem 4 remark 2 in [19], the desired Markov distribution P* is given by $$P^*(s_k, s_{k-1}) = \begin{cases} \lambda^{-1} u(s_{k-1}) W(s_k | s_{k-1}) v(s_k) & (s_k, s_{k-1}) \in E \\ 0 & (s_k, s_{k-1}) \notin E \end{cases} \quad (3)$$

where E is the subset of $E_0$ of all consecutive channel states for which the resulting samples of p[n] do not exceed $p_{peak}$, $\lambda$ is the largest eigenvalue of the matrix obtained from W by replacing the entries $(s_k, s_{k-1}) \notin E$ by zeros, and u and v are the corresponding left and right eigenvectors.

To simplify the following notations, from here on any stationary distribution P $(s_k|s_{k-1})$ is denoted by P (c|s) instead, since given s the next channel state is uniquely defined by the symbol c.

For the implementations described further on, we propose that the symbol transition probabilities will be of the form $2^{-l}$ (l an integral). Since the maximal entropy distribution P* in general does not hold this property, a quantized version of P*, denoted from here on simply as P, is used instead. Two quantization methods will be further described for the conditional distribution P*.

Specifically, for a conditional distribution Pr(c|s) the quantized probability $^-$Pr(c|s) is obtained by rounding Pr(c|s) to the closest2-b. If required, the lowest probabilities are manipulated to ensure that the sum of the quantized distributions equals 1. Since a 0 probability is rounded to 0, it is ensured that no illegal symbol transition occurs when applying $^-$P*.

B. Theoretical Gain

The channel capacity of a transmission with Markovian constraint generally cannot be found analytically. Instead, it can be derived by monte-carlo simulation as described in [20]. In our case, the state depends on the input sequence only, therefore the recursion of $\mu_k(s_k)$ (using the reference notation) reduces to:

$$\mu_k(s_k) = \sum_{s_{k-1}} \sum_{c_k} Pr(y_k | c_k) \cdot Pr(c_k | s_{k-1}) \cdot \delta(s_k, s_{k-1}, c_k) \mu_{k-1}(s_{k-1}) \quad (4)$$

Where $\delta(s_k, s_{k-1}, c_k)$ is 1 if given the state $s_{k-1}$ the symbol $c_k$ yields to state $s_k$, and 0 otherwise. The channel capacity of the shaped transmission was calculated using equation (4), with an output sequence of length $n=10^5$ for several peak constraints and SNRs.

Figure 2:
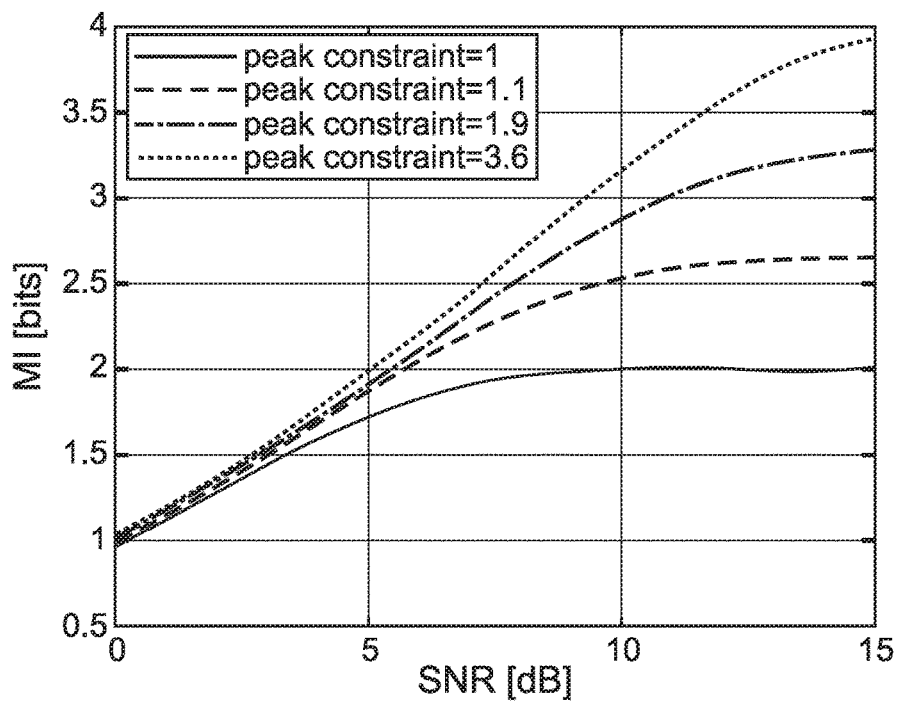
FIG. 2—is a graph illustrating effect of applying a peak constraint to transmission.

FIG. 2 shows an example of the shaped transmission channel capacity, for a 16-QAM constellation with RRC filter span of 4 symbols and roll-off factor 0.1. It can be seen that the maximum achievable system rate is increasing with the SNR and with the peak constraint. MI is a so-called Mutual Information, which is a mathematical bound showing how much information can be sent on a given channel. The higher MI the better is the transmission.

Practical Symbol Distribution in Case of Using Trellis Codes

An Example for Practical Transmission

We now apply the desired quantized distribution on practical transmission. To do so, the binary information stream u is first encoded with a rate d/m systematic ECC code into a code word c. The code word c is then divided into m-tuples, with $m=\log_2(M)$, where in each tuple the first d bits are information bits and the last m-d bits are parity bits. Each tuple is then sequentially assigned to a constellation symbol, using a mapping table. The mapping function at each time instance k remembers the last $K_s-1$ mapped symbols, which define the channel state at time k, and the mapping table which is used to map the k'th tuple is based on the channel state, i.e. the mapping function holds $M^{K_s-1}$ mapping tables of size $2^m$. To apply a non-uniform symbol distribution, the allocation of m bits to a symbol is done non-uniformly, by assigning $2^{m-k}$ binary combination of a tuple (here "labels") to a symbol with probability $2^{-k}$. Since the m bits in the tuple are uniformly distributed, it is insured that the given symbol is indeed chosen with probability $2^{-k}$.

An example of a mapping table with m=4 and M=16 is presented in table 1. In this example, symbol $c_1$ is transmitted with probability ¼, symbols $c_2$-$c_6$ are transmitted with probability ⅛ each, and symbols $c_7$, $c_8$ are transmitted with probability 1/16 each. Note that in the case of $c_1$ which is assigned to 4 "labels", the lower 2 bits are actually erased. Similarly, the symbols with probability ⅛ erase one bit. The binary symbol with erasable bits is marked as "Thinned label" in Table 1.

TABLE I

Example of a non-uniform bit mapping table. $b_4$-$b_1$ is the binary representation of the address (i.e., 16 possible binary combinations of a 4-bit tuple; also called "labels" in the description).

| Address | $b_4$ | $b_3$ | $b_2$ | $b_1$ | symbol | Pr | Thinned label |
|---|---|---|---|---|---|---|---|
| 0 | 0 | 0 | 0 | 0 | $c_1$ | ¼ | 00XX |
| 1 | 0 | 0 | 0 | 1 | | | |
| 2 | 0 | 0 | 1 | 0 | | | |
| 3 | 0 | 0 | 1 | 1 | | | |
| 4 | 0 | 1 | 0 | 0 | $c_2$ | ⅛ | 010X |
| 5 | 0 | 1 | 0 | 1 | | | |
| 6 | 0 | 1 | 1 | 0 | $c_3$ | ⅛ | 011X |
| 7 | 0 | 1 | 1 | 1 | | | |
| 8 | 1 | 0 | 0 | 0 | $c_4$ | ⅛ | 100X |
| 9 | 1 | 0 | 0 | 1 | | | |
| 10 | 1 | 0 | 1 | 0 | $c_5$ | ⅛ | 101X |
| 11 | 1 | 0 | 1 | 1 | | | |
| 12 | 1 | 1 | 0 | 0 | $c_6$ | ⅛ | 110X |
| 13 | 1 | 1 | 0 | 1 | | | |
| 14 | 1 | 1 | 1 | 0 | $c_7$ | 1/16 | 1110 |
| 15 | 1 | 1 | 1 | 1 | $c_8$ | 1/16 | 1111 |

Bit Labeling

To achieve the Markov symbol transmission probability distribution and to ensure the PAPR reduction, the mapping comprises possible selecting, for a specific data portion (tuple) at a given channel state, such a symbol (or such a Thinned label) that minimizes $p_{peak}$ by allowing to puncture (omit) as many bits as possible in its bit sequence. The higher the probability assigned to the selected symbol (or a selected Thinned label), the greater may be the number of non-transmittable (omittable) bits, still not preventing decoding of the transmitted Thinned label.

The mapping of the tuples into symbols can be implemented by using a channel-state dependent mapping table comprising, for each current channel state, quantized values of probabilities of the channel state to become $s_k$, given that the current state is $s_{k-1}$.

The above-mentioned mapping terminates with selecting said symbol from two or more possible symbols assigned to two or more unequal probabilities, as the symbol having the highest probability.

The probabilities form 1 in sum. In the proposed technique, each of the probabilities is quantized to $2^{-b}$, where b is a number of passing bits (i.e., non-omittable bits) in the selected symbol. Each of the quantized probabilities can be obtained by rounding it to the closest $2^{-b}$ and manipulating the lowest probabilities to ensure that the sum of the quantized probabilities equals to 1.

In practice, the tuples may be sequentially mapped into symbols using a set of channel-state dependent mapping tables, the current channel state being updated with the newly obtained symbol and the process is repeated with the next tuple.

One issue which must be addressed prior to implementation is the issue of bit labeling. In standard transmission, the Gray mapping, which minimizes bit error per error to the nearest symbol at the receiver, is commonly used. Gray mapping is easily defined on standard constellations like 16-QAM or 8-PSK when uniform transmission is used. However, in our case symbols are not sent uniformly and different symbols may carry unequal number of bits. Another complication that can affect performance lies in the fact that a symbols bit label depend on the channel state. To demonstrate the implication of this, consider a scenario in which a symbol error occurred at the receiver. To correctly de-map the symbols, the receiver must decode the channel state as well. However, since the channel state is the sequence of the last $K_s$-1 symbols, a single symbol error results in an error in the evaluation of $K_s$-1 consecutive states. Since each state holds a different bit labeling map, even if all other symbols are evaluated correctly their bits might be in error due to their state-dependent bit labeling. Following these observations, when constructing the symbol bit maps two objectives are to be taken under consideration:

1) For each state the labeling of the symbols should be as close to Gray mapping as possible.
2) For "neighbor states", i.e. states that differ by one symbol, the labeling should be as close as possible.

Therefore, to further minimize $p_{peak}$, the mapping step may comprise performing it as close as possible to Grey bit labelling.

Still further, the mapping step may comprise a balanced, error-resistant bit labelling approach, according to which for close channel states differing by one symbol (possibly by error), the mapping is as close as possible to one another.

In practice, the mapping may comprise both performing it as close as possible to Grey, and balancing it. One example of balancing the mapping will be described below.

Two exemplary bit labeling algorithms A and B are proposed below.

We remind that the term bit labeling or label is used for indicating a binary combination of a data portion/tuple, while the term Thinned label is used to replace a common symbol assigned to a quantized group of labels having close probabilities.

The bitmaps (mapping tables) may be prepared in advance (off-line), and may be then used for mapping the tuples into symbols on-line.

However, the Authors acknowledge a possibility of building suitable bitmaps online, for immediate use thereof in the proposed Markovian transmission.

Algorithm A

We now give a novel suboptimal bit labeling algorithm which addresses these two objectives. Let $Q_s$ be the set of all bitmaps for a constellation C with symbol distribution P (c|s). Each bitmap $q_{s,i} \in Q_s$, i=1, ..., $|Q_s|$ is a function $q_{s,i}: C \rightarrow T^m$ where T is the ternary set:

$$T \triangleq \{0, 1, X\}.$$

Let $d_{s,i}$ (c) be the sum of Hamming distances between the bit labelings of symbol c and its closest neighbors under the bitmap $q_{s,i}$ $$d_{s,i}(c) \triangleq \sum_{c' \in N(c)} d_H(q_{s,i}(c), q_{s,i}(c')) \qquad (5)$$

where $d_H$ (•, •) is the Hamming distance and N (c) is the set of all symbols in C\c with minimal distance to c. The mean Hamming distance (MHD) of a bitmap $q_{s,i}$ is defined as $$MHD(q_{s,i}) \triangleq E[d_{s,i}(c)] = \sum_{c \in C} 2^{-1_{s,c}} d_{s,i}(c) \qquad (6)$$

where $1_{s,c}$ is the number of non-erased bits in the label of symbol c in state s.

The MHD is used as a simple measure for the quality of the mapping. The lower the value of the MHD, there are less bits in error when error to the nearest symbol occurs. In the case of uniform 16-QAM transmission with Gray mapping, the MHD is 3. Similarly, for Gray mapping on uniform 8-PSK the value of MHD is 2.

For two bitmaps $q_{s_1,i} \in Q_{s_1}$, $q_{s_2,j} \in Q_{s_2}$ the mapping distance $d_m(q_{s_1,i}, q_{s_2,j})$ is defined as $$d_m(q_{s_1,i}, q_{s_2,j}) = \sum_{c \in C} d_H(q_{s_1,i}(c), q_{s_2,j}(c)) \quad (7)$$

At first, it would seem that only bitmaps with the minimal MHD possible for each state are of interest. This restriction would be optimal for the first objective stated earlier, which is to minimize the bit error probability in the symbol error scenario. However, this restriction may be too stringent since it would impose a severe constraint on the second objective, which is to use close maps for neighbor states. Additionally, it is not always feasible to find all the bitmaps with the minimal MHD value possible. For these reasons, when constructing the state bitmaps we constraint the candidate bitmaps of each state to a subset of $Q_s$, denoted as $Q^*_2$, which contains only bitmaps with low MHD value, but not necessarily the minimal value and not necessarily all bitmaps with a given MHD value.

We now discussed in the process for constructing $Q_s$ and $Q^*_s$, therefore, the goal is to find the set of all bitmaps for a constellation C with non-uniform symbols distribution P (c|s). Let $m_i$, i=1 . . . M, be a symbol transmitted with probability pi, where $pi=2-li$ for li an integer and $\Sigma_{i=1}^{M} p_i=1$.

The number of bits carried by the symbol is therefore li. A bit label of the symbol mi is a length li binary sequence assigned to mi. A complete assignment of unique bit labels to all M symbols is denoted as bit mapping. To avoid ambiguous interpretation of a given bit, we require that the bit mapping comprises a prefix code, specifically, a Huffman code. The purpose of the bit labeling process is to find the set of all bit mappings, or Huffman codes on the distribution p, which minimize the bit error probability on the receiver side.

Theorem 4.1.

Let $L_k$, k=1 . . . K, be the ascending ordered set of label lengths, and let $N_k$ be the number of messages with length $L_k$. Define $S_k = 2^{L_k} - \Sigma_{k'=1}^{k-1} N_{k'} 2^{L_k - L_{k'}}$ for k>1 and $S_1 = 2^{L_1}$. Then the number of Huffman codes on p is given by $$N = \prod_{k=1}^{K} \frac{S_k!}{(S_k - N_k)!} \quad (8)$$

Proof. Starting from the shortest messages, there are $S_1 = 2^{L_1}$ possible labels to assign to symbols, which yields $S_1!/(S_1-N_1)!$ possible such assignments. Moving to the second shortest messages, there are $2^{L_2}$ possible labels in total, out of which $N_1 2^{L_2 - L_1}$ are already assigned in the previous step, leaving $S_2$ labels to choose from. This process iterates to produce (8). □

The above proof also outlines a recursive algorithm for constructing all the bit mappings of p, where each recursion stage relates to a label length $L_k$. In each stage k the following operations are performed:

1) Construct all $S_k$ labels of length $L_k$ using the length $L_{k-1}$ prefixes from stage k−1.
2) Go over all $S_k!/(S_k-N_k)!$ assignments of labels to the $N_k$ messages.
3) For each assignment, use the $S_k-N_k$ un assigned labels as prefixes for stage k+1.

In practice, this process may not be feasible due to the large number of possible bit mappings. For example, for the case of K=3 groups with length L=(3, 4, 5) and N=(3, 9, 2) messages in each group, there are over $2.4 \cdot 10^9$ possible bit mappings. To reduce the number of bit mappings generated and saved, we recall that in fact most bit mappings are not relevant as we are interested only in the bit mappings with low mean Hamming distance (see equation 6). To exploit this requirement, in every recursion stage the MHD can be calculated based only on the current assignment, and only assignments with a low value of this intermediate MHD are passed along to the next stage. In the example given above, the number of bit mappings was reduced due to this technique to about $10^5$. In our implementation we constructed the set Q by passing to the next stage the assignments with the 2 lowest MHD values. After constructing Q, we chose for Q* the 10% of the bitmaps with the lowest MHD value, limited by 128 bitmaps.

Algorithm 1 below is proposed to select the bit labeling for each state. The array bitmaps[ ] is used to hold the chosen bitmaps for each state and the array assigned[ ] is used to mark the states that have been assigned a bitmap. By init, all values in assigned[ ] are set to false.

---

Algorithm 1 Bit labeling assignment for $s_0$ = 1 to $M_s$ do
    if assigned[$s_0$] == false then
        if Any of $s_0$ neighbors has been assigned then
            $s_1$ ← random assigned neighbor of $s_0$
            bitmaps[$s_0$] ← $\arg\min_{q \in Q^*_0} d_m * (q, bitmaps[s_1])$
            assigned[$s_0$] ← true
        else
            $q_0$ ← random q ∈ $Q_0^*$
            bitmaps[$s_0$] ← $q_0$
            assigned[$s_0$] ← true
        end if
    end if
end for

---

Algorithm B

In order to attempt reduce errors caused by missing the right state, phenomenon which is commonly occurring when the first algorithm is in use, we present second bit labeling algorithm. Compared to algorithm A, in this algorithm, the bit label for a certain channel state dependent only on the quantized probabilities P, of this certain state.

For each channel state, with quantized probabilities P, the algorithm works independently from other channel states as follows: firstly, it is clear that a symbol with quantized probability of $2^{-m}$, where $m=\log_2 M$, should not share his bit label with other constellation symbols. Thus, the bit label for symbols with probability of $2^{-m}$ is the same as it was in the Gray labeling. Then, the algorithm fits for each symbol with quantized probability different than 0 or $2^{-m}$, another label (or labels), from the free labels. In the beginning of the process, the free labels are all the Gray bit labels of the zero probability symbols. Symbol with probability $2^{-(m-1)}$ should have two labels, one label is the Gray bit labeling of this symbol and the second label should be chosen from the bit labeling of the zero probabilities symbols. The Hamming distance between those labels should be equal to one. Symbol with $2^{-(m-2)}$ should have four labels, one label is the Gray bit labeling of this symbol and the other three labels should be chosen from the bit labeling of the zero probabilities symbols. The Hamming distance between those four labels should be a maximum of 2 and so on.

Figure 3:
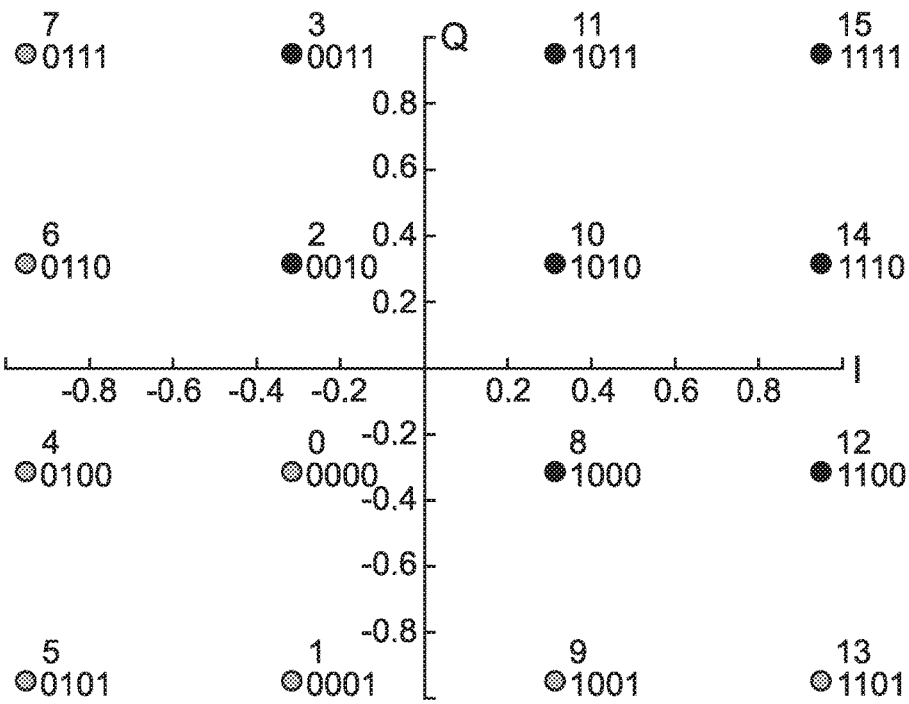
FIG. 3—illustrates an example of obtained symbol distribution for a 160 QAm constellation with GRAY mapping.

For example, assume that for a certain channel state, the zero probability symbols are [0, 1, 4, 5, 6, 7, 9, 13], the bit labeling for this channel state is demonstrated in table II and the arrangement of the symbols in the constellation is shown in FIG. 3.

TABLE II

Example of a non-uniform bit labeling table, for a certain channel state, when the bit labeling algorithm is algorithm B. $b_4$-$b_1$ is the binary representation of the address (a binary combination of the current tuple), and the Thinned label is a label comprising non-transmittable bits "X".

| address | $b_4$ | $b_3$ | $b_2$ | $b_1$ | Symbol number | Pr | Thinned Label |
|---|---|---|---|---|---|---|---|
| 0  | 0 | 0 | 0 | 0 | 2  | 1/8  | 00X0 |
| 2  | 0 | 0 | 1 | 0 |    |      |      |
| 1  | 0 | 0 | 0 | 1 | 3  | 1/4  | 0XX1 |
| 3  | 0 | 0 | 1 | 1 |    |      |      |
| 5  | 0 | 1 | 0 | 1 |    |      |      |
| 7  | 0 | 1 | 1 | 1 |    |      |      |
| 8  | 1 | 0 | 0 | 0 | 8  | 1/8  | 100X |
| 9  | 1 | 0 | 0 | 1 |    |      |      |
| 10 | 1 | 0 | 1 | 0 | 10 | 1/16 | 1010 |
| 11 | 1 | 0 | 1 | 1 | 11 | 1/16 | 1011 |
| 12 | 1 | 1 | 0 | 0 | 12 | 1/8  | X100 |
| 4  | 0 | 1 | 0 | 0 |    |      |      |
| 13 | 1 | 1 | 0 | 1 | 15 | 1/8  | 11X1 |
| 15 | 1 | 1 | 1 | 1 |    |      |      |
| 6  | 0 | 1 | 1 | 0 | 14 | 1/8  | X110 |
| 14 | 1 | 1 | 1 | 0 |    |      |      |

FIG. 3 is an example of a 16-QAM constellation with GRAY mapping. According to the given example, the grey dots are the symbols with a zero probability and the black dots are the symbols that are allowed to be transmitted.

Quantization

The quantization method is to obtain the quantized probability P (c|s) is rounding P*(c|s) to the closest $2^{-l}$ (in one our example, 1 is a natural number). If required, the lowest probabilities are manipulated to ensure that the sum of the quantized distributions equals 1. Since a 0 probability is rounded to 0, it is ensured that no illegal symbol transition occurs when applying P. The only effect of the quantization process is therefore a reduction of the transmission entropy, and thus also the transmission rate. In this work the maximal value of 1 we have used is 4, with this maximal value and the distributions analyzed in the rest of this paper, the reduction in entropy due to quantization was usually approximately 0.1 bits. Therefore, it is preferable, if possible, to build bit labeling on a distribution that was quantized according to the closest $2^{-l}$ probability. Indeed, bit labeling A is performed on a distribution that was quantized in this way. This quantization method denoted from here on as "quantization A".

However, when applying bit labeling B on a distribution that was quantized according to quantization A, it is not always possible to build valid bit labeling for each channel state. Valid bit labeling must meet the following condition—the number of bits that are not 'X', in the bit label of a certain symbol, must be $-\log_2 P$, where P is the symbol probability. When quantization A and bit labeling B are made independently, there is high likelihood of a failure in finding a valid bit labeling for some channel state. An example of un-valid bit label for some channel state is shown in FIG. 4 on the left. In this example, the probabilities are quantized according to quantization A and the most outer symbols probability is zero, thus they could not be transmitted. It can be seen that 1/8 probability symbols bit labels have only two bits that are not 'X' instead three bits, thus, when quantization A and bit labeling B are used together, it is not possible to find valid bit labeling for this channel state. In order that the bit labeling for this state will be valid, for each symbol with zero probability need to be in the constellation a symbol with 1/8 probability with one hamming distance from him. Therefore, satisfactory quantization could be as shown in FIG. 4B (to the right).

Figure 4A:
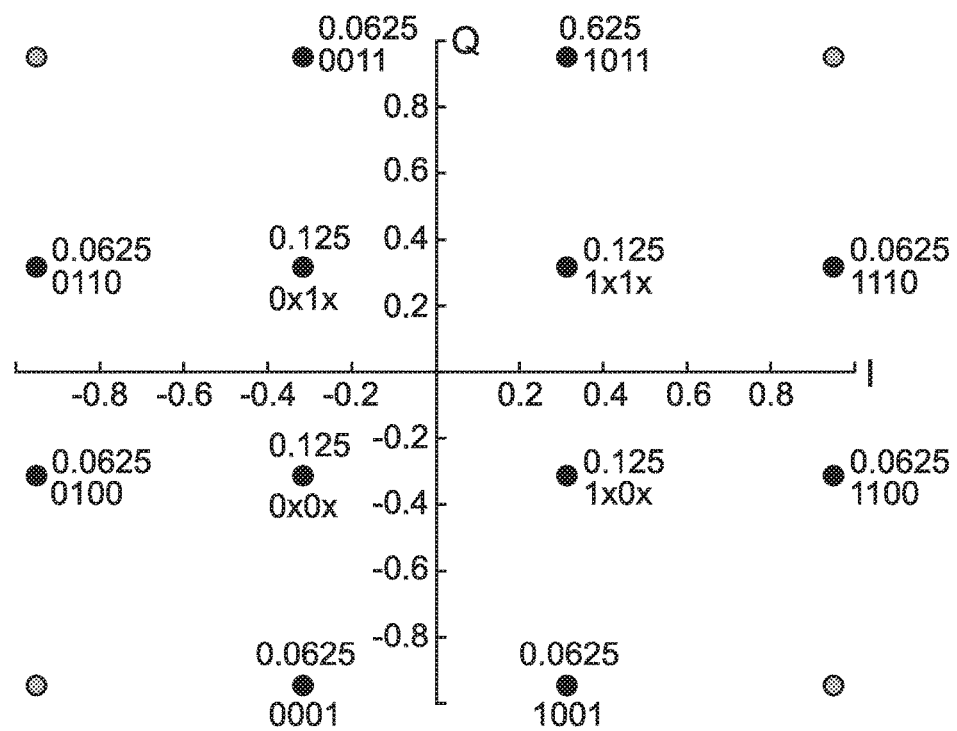
FIGS. 4A and 4B—compare two examples of bit-labeling and quantized probabilities.
Figure 4B:
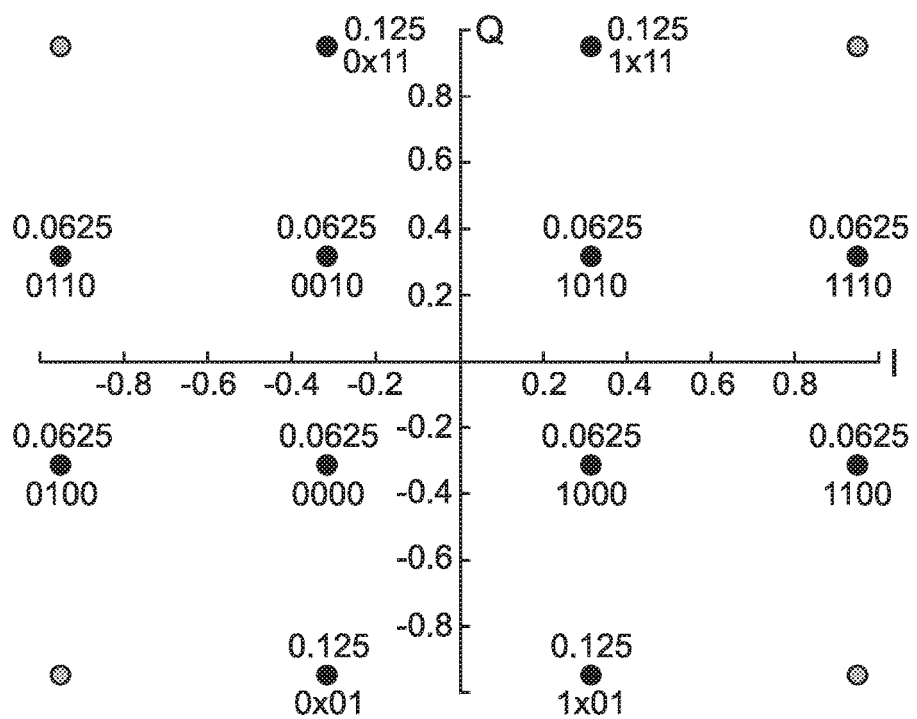

FIGS. 4A and 4B give examples of un-valid bit labeling and quantized probabilities (4A) and vaild bit labeling and quantized probabilities (4B). The grey dots are the symbols with a zero probability and the black dots are the symbols that are allowed to be transmitted.

As a result, using bit labeling algorithm B requires a modification in the probabilities quantization method in a way that each channel state bit labeling will be valid.

Applying the method from section III-B on the quantized distributions P for various peak constraints, and comparing to the capacity of uniform un-shaped transmission, yields the theoretical SNR gain of each P. In addition, the PAPR gain can also be found analytically, as both $p_{peak}$ and $p_{avg}$ are known for each P, and can be compared to the PAPR of the uniform transmission.

Figure 5A:
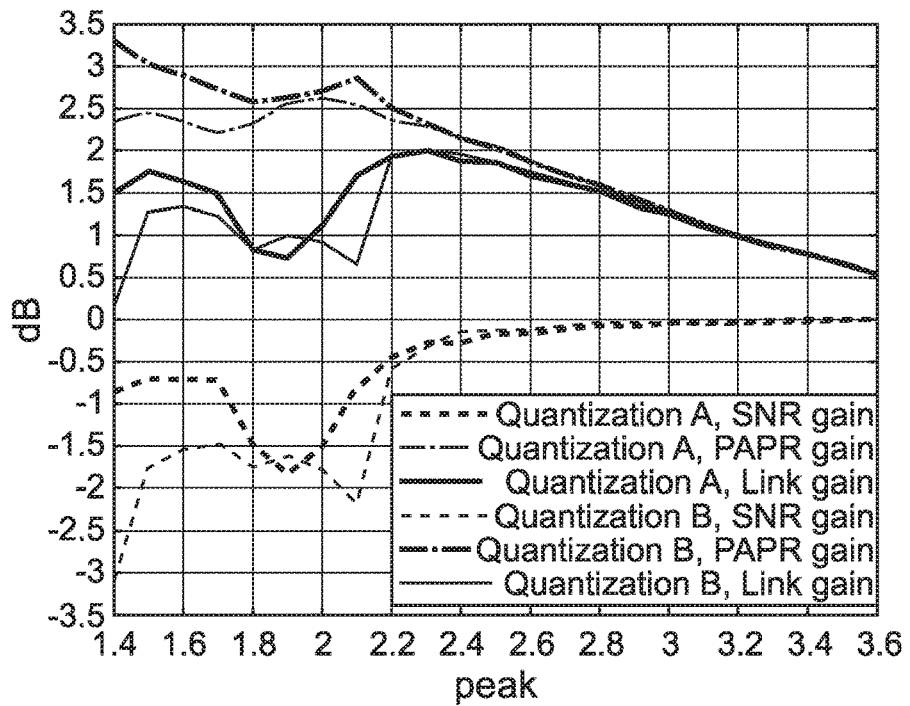
FIGS. 5A and 5B—compare achievable gains between two different versions of quantization.
Figure 5B:
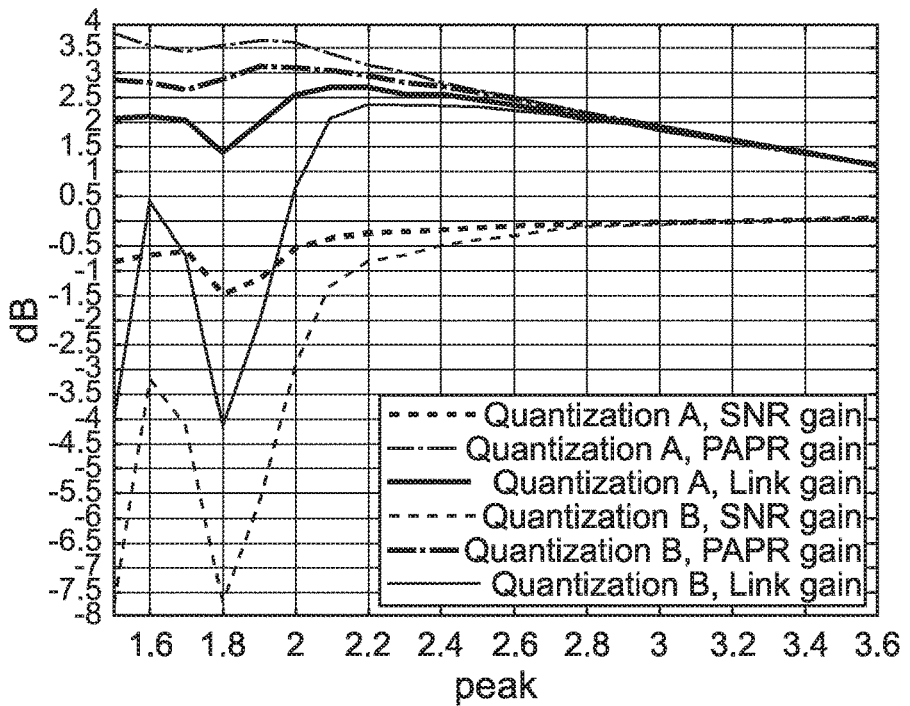

Such a comparison is presented in FIGS. 5A and 5B for the case of transmission in rate of 3 bits/symbol over a 16-QAM constellation and for two different RRC filters. It can be seen that for the case of a RRC filter with roll-off factor 0.2 and $K_s$=4, which is presented in the top graph (FIG. 5A), the maximal link gain is expected for peak constraint of 2.3, for both quantization A and the modified quantization, which denoted from here on as "quantization B". For the case of a RRC filter with roll-off factor 0.1 and $K_s$=6, which is presented in the bottom graph (FIG. 5B), the maximal link gain is expected for peak constraint of 2.2, for both quantization A and quantization B.

FIGS. 5A and 5B present achievable gains comparison between quantization A and quantization B. Quantization A is the nearest 2-1 quantization and Quantization B is the modified quantization. The comparison is for a transmission rate of 3 bits/symbol over a 16-QAM constellation. In the top graph (FIG. 5A), the roll-off factor of the RRC filter is 0.2 and his span is Ks=4. In the bottom graph (FIG. 5B), the roll-off factor of the RRC filter is 0.1 and his span is Ks=6.

Figure 6:
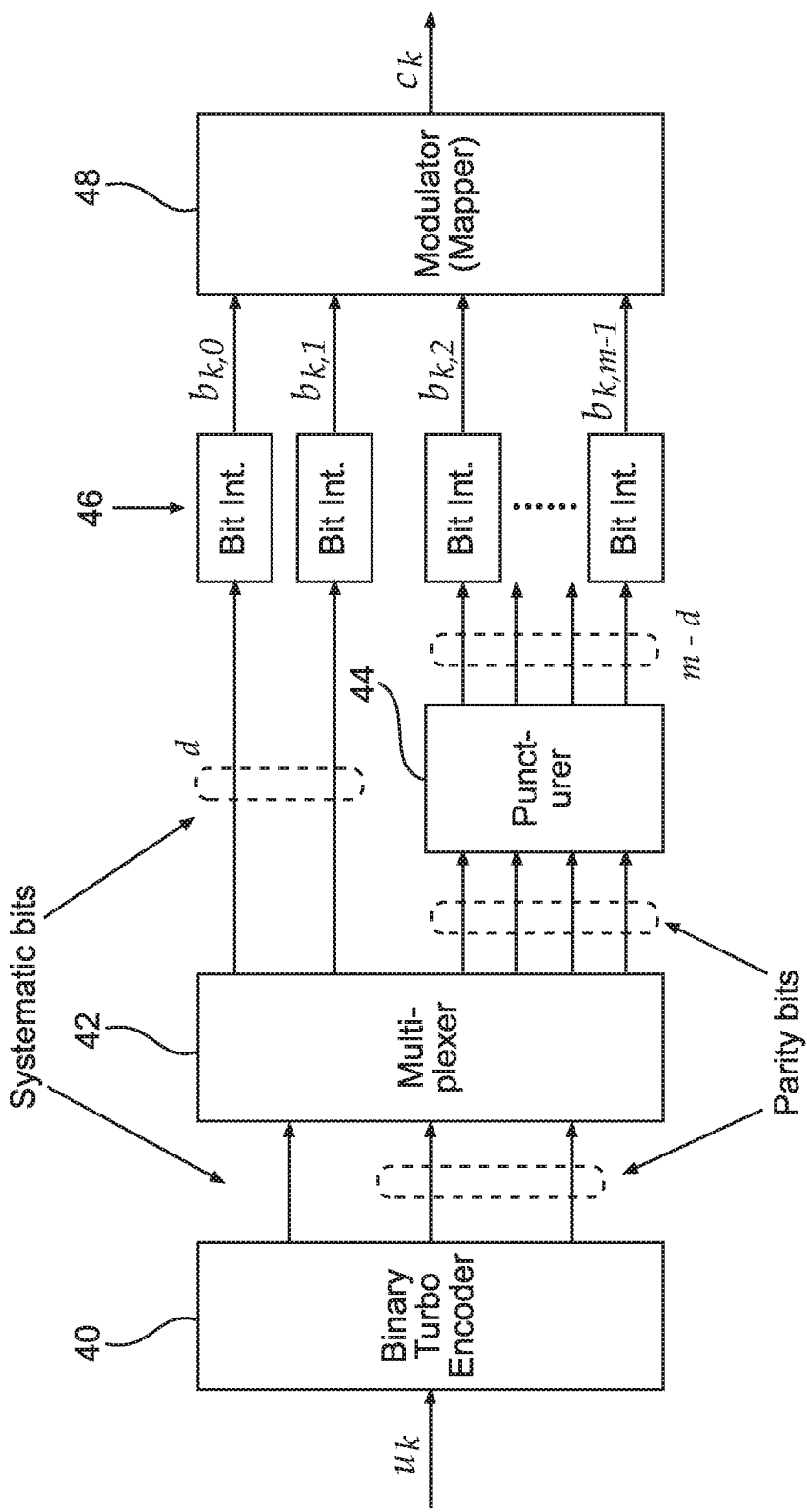
FIG. 6—is a schematic block diagram of an exemplary pragmatic turbo encoder suitable for implementing the proposed technique.

FIG. 6 is a block diagram of an example of a pragmatic turbo encoder with a mapper according to the invention. It comprises an exemplary Turbo Encoder 40, a Multiplexer 42 for combining information bits (d) with parity bits, a basic puncturer 44 related to Turbo codes, which produce (m-d) parity bits to be interleaved with information bits, a set of Bit interleavers 46, and a Mapper 48 which receives a data portion ($b_{k,0}$ ... $b_{k,m-1}$) and produces a symbol $c_k$. In the shaped case, the signal mapper (Modulator) 48 saves the current channel state and applies additional puncturing (not shown in this figure) to achieve non-uniform signaling based on symbol probability distribution.

Figure 7:
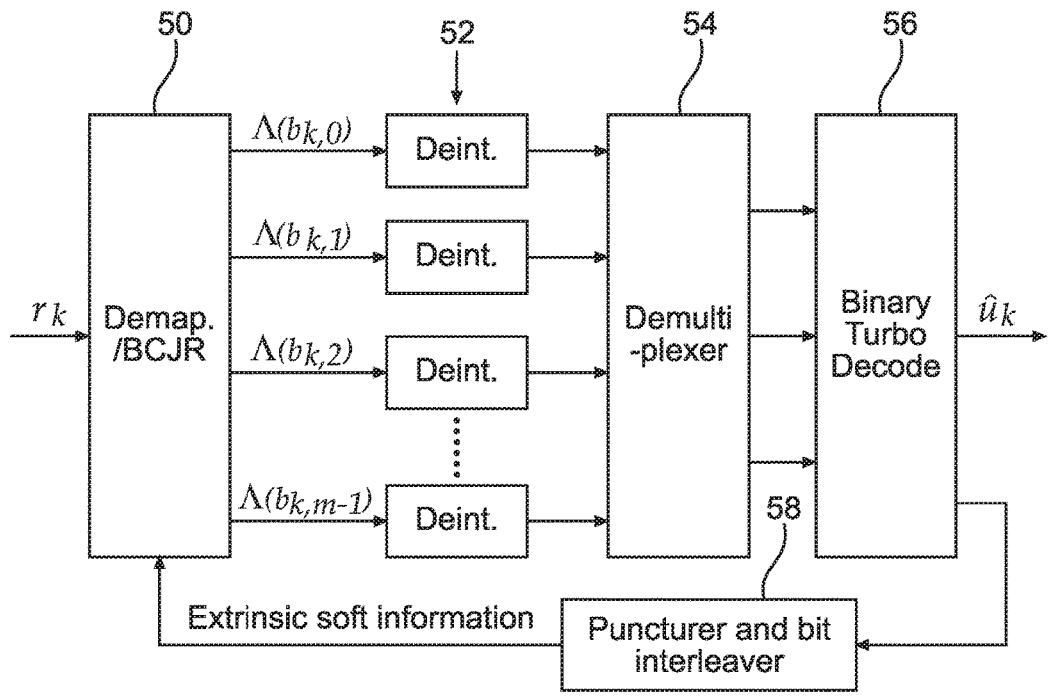
FIG. 7—is a schematic block diagram of an exemplary pragmatic turbo decoder suitable for implementing the proposed technique.

FIG. 7 is a block diagram of an example of a pragmatic turbo decoder with a demapper 50 according to the invention. In this specific shaped case, the de-mapper 50 is replaced by a BCJR decoder which is aware of the modified Markov model applied at the transmitter and runs over the channel state progression. The BCJR 50 restores the information bits taking into account the bits punctured while mapping the tuples, according to feedback received from block 56 an block 58. A set of Deinterleavers 52 supply a restored data portion to a Demultiplexer 54 which provides input to the Turbo Decoder 56. Block 56 forms an output (restored) data portion and a feedback to the Puncturer box 58 (which relates to basic puncturing known for Turbo codes) connected to Demapper 50. The way of producing the feedback will be described below.

We will now describe in more details, how the distribution P is applied on a practical scheme, such as FIG. 6+FIG. 7, using Turbo coded modulation (TCM). In pragmatic binary TCM [24], a single binary turbo code of rate 1/3 is used as the component code.

At time instance k, the encoder receives a d-tuple of information bits $u_k$ and its outputs are multiplexed and punctured to obtain m bits per symbol, with d systematic information bits and m–d parity bits, as shown in FIG. 6. The Mapper/modulator 48 then maps each m-tuple into a symbol from $C_k$. In the non-shaped system m=$\log_2$(M) and the mapping is a constant Gray code. In the shaped system, the mapping depends on the channel state. Due to "X" mapping digits, the mapping itself applies an additional puncturing (not shown), therefore this scheme is in fact a variable-rate turbo code, since the number of parity bits given to each information bit varies as a function of the input combination.

At the receiver side, shown in FIG. 7, the noisy symbols $r_k$ are received by a Demapper module in the non-shaped case, or a BCJR module in the shaped case. In both cases, the LLR values $\Lambda(b_i)$ are produced for each encoded bit. The LLR values are used, after appropriate bit de-interleaving, as an apriory input to a binary Turbo Decoder 56. In each iteration, the turbo Decoder produces extrinsic LLRs which are used as an apriory input to the demapper/BCJR module, which in turn calculates new extrinsic LLRs which are sent back to the turbo decoder. After a pre-determined number of iterations has been reached, the bit estimations $\hat{u}_k$ are determined by performing hard decision on the turbo decoder's aposterior LLRs.

Let c be the transmitted symbol and r be the received noisy symbol, with noise variance $\sigma^2$. In the non-shaped case, the demapper extrinsic LLRs are calculated as $$\Lambda(b_i) = \log \frac{\sum_{c:b_i=0} \exp\left(-\frac{1}{2\sigma^2}|r-c|^2\right) \cdot Pr(c)}{\sum_{c:b_i=1} \exp\left(-\frac{1}{2\sigma^2}|r-c|^2\right) \cdot Pr(c)} - \Lambda^e(b_i) \quad (9)$$

where $\Lambda^e(b_i)$ is the extrinsic LLR from the Turbo decoder and Pr(c) are the extrinsic symbol probabilities which are calculated in each iteration from $\Lambda^e(b_i)$. Initially, all $\Lambda^e(b_i)$ are set to 0.

In the shaped case, $\Lambda(b_i)$ are calculated using BCJR algorithm applied on the channel states Trellis diagram. The extrinsic symbol probabilities used by the BCJR are given by $$Pr(c) = \prod_{i=1}^{l_c} Pr(b_i) \quad (10)$$

where $Pr(b_i)$ are calculated from $\Lambda^e(b_i)$.

Combining with Clipping

Since the complexity and the total required memory increasing exponentially with the RRC filter span, this algorithm becomes unpractical when the demand of high spectral efficiency is needed. Therefore, the influence on the link gain of high span RRC filter must to be taken. A possible solution to combine between transmission with high spectral efficiency to the presented PAPR reduction algorithm is to optimize the algorithm for low RRC filter span, but in practice, the system RRC filter span is much higher. Then, after the RRC filter, the signal is passing through limiter which is simply clip all the samples that their power is above the peak constraint. The peak power deviation after the filter is occurring because the algorithm optimization is made for lower filter span compared to the actual filter span, however, the influence of the clipping is negligible since there is already very low energy in the signals that exceed the limit.

Simulation Results

The pulse shape filters tested in our simulations are RRC filters with effective duration $K_s$=6 and $K_s$=4 with roll-off factor 0.1 and 0.2 respectively. The shaping was applied on a 16-QAM, 16-APSK and 8-PSK constellations. Since the resulting number of channel states in the case of $K_s$=6 and M=16 is $16^5$, it is not feasible to run a full BCJR in the decoder, instead, an M-BCJR [23] was used with 32 survivor states, which reduced memory requirements significantly. Increasing the number of surviving states above 32 seemed to have no additional gain.

In the shaped transmission, the channel state Trellis at the end of each frame was terminated to state 0. Power measurements on samples caused by inter-frame symbol sequences were ignored. In practice, peak samples caused by such sequences can be avoided in several ways, such as choosing a termination sequence with low magnitude symbols, trying to reach a given channel state with only legal symbol transitions or giving up termination all together.

The code used with all schemes is a standard rate 1/3 turbo encoder [25], made up of two elementary encoders with memory size 4 and the same generator polynomial 37-23 (octal number 37 represents the feed-forward connections and 23 the feedback connections). This code is known to be an optimal code with memory size 4 for various turbo-code rates [26]. The Turbo decoding was run for 18 iterations on block length of 4096 information bits with pseudorandom interleaving.

As explained in section IV-C, bit labeling A is performed on distribution that is quantized according to quantization A and bit labeling B is performed on distribution that is quantized according to quantization B. The first and the second combinations will denoted from here on as "scheme-A" and "scheme-B" respectively.

As shown in FIG. 5, in the case of rate 3 bits/symbol with roll-off 0.1 and $K_s$=6, the maximal theoretical gain is expected at peak constraint of 2.2 for a 16-QAM constellation. Using the same analysis from section IV-C on APSK constellation, is yielding maximal theoretical gain at peak constraint of 2.1. For a shaped 16-QAM transmission, this gain is expected to be about 2.8 dB and 2.3 dB compared to unshaped 16-QAM transmission for scheme-A and scheme-B respectively. For a shaped 16-APSK transmission according to scheme-B, this gain is expected to be about 2.68 dB compared to unshaped 16-QAM transmission. Those peak constraints was indeed found to achieve the highest link gain also in simulations. The shaped transmission is compared to non shaped 16-QAM and 16-APSK transmissions with the same pulse shape. The resulting FER curves and PAPR distribution are presented in FIGS. 8, 9 respectively for both schemes. The SNR at which FER $10^{-2}$ is reached, the PAPR corresponding to cross-over probability of $10^{-4}$ and the link gain compared with a uniform 16-QAM transmission with the same RRC filter as the shaped transmission are summarized in table III. For a shaped transmission over 16-QAM constellation, it can be seen that scheme-A achieves an overall link gain of 1 dB compared to uniform 16-APSK transmission and 1.65 dB compared to uniform 16-QAM transmission. For scheme-B, the shaped 16-QAM transmission achieves an overall link gain of 1.58 dB compared to uniform 16-APSK transmission and 2.2 dB compared to uniform 16-QAM transmission. Comparing the $10^{-2}$ SNR to the capacity, it can be seen that the uniform transmission distance from capacity is 0.92 dB and 0.96 dB for uniform 16-QAM and 16-APSK respectively, while the shaped 16-QAM transmission distance from capacity is 2.12 dB and 0.95 dB for scheme-A and scheme-B respectively. This indicates that for a shaped transmission over 16-QAM constellation, scheme-A is suffered from a loss of 1.2 dB. In scheme-B the additional loss is negligible. For a shaped transmission over 16-APSK constellation, it can be seen that scheme-B achieves an overall link gain of 1.83 dB and 2.47 dB compared to uniform 16-APSK and 16-QAM transmissions respectively. Comparing the $10^{-2}$ SNR to the capacity, it can been seen that the shaped 16-APSK transmission distance from capacity is 1.06 dB while the distance for a uniform 16-QAM transmission is 0.92 dB. This indicates that in this case, the shaped transmission over 16-APSK constellation suffers from a loss of 0.14 dB.

TABLE III

Rate 3 bits/symbol with $K_s$ = 6 and roll-off 0.1, scheme-A and scheme-B FER, PAPR and link gain relative to16-QAM constellation with uniform transmission summary.

| Syste | Capacity | SNR $10^{-2}$ | PAPR $10^{-4}$ | Link Gain |
|---|---|---|---|---|
| 16-QAM uniform | 9.3 dB | 10.22 dB | 6.7 dB | |
| 16-APSK uniform | 9.32 dB | 10.28 dB | 6 dB | |
| 16-QAM, scheme-A | 9.55 dB | 11.67 dB | 3.6 dB | 1.65 dB |
| 16-QAM, scheme-B | 10.05 dB | 11 dB | 3.7 dB | 2.2 dB |
| 16-APSK, scheme-B | 10.09 dB | 11.15 dB | 3.3 dB | 2.47 dB |

Figure 8:
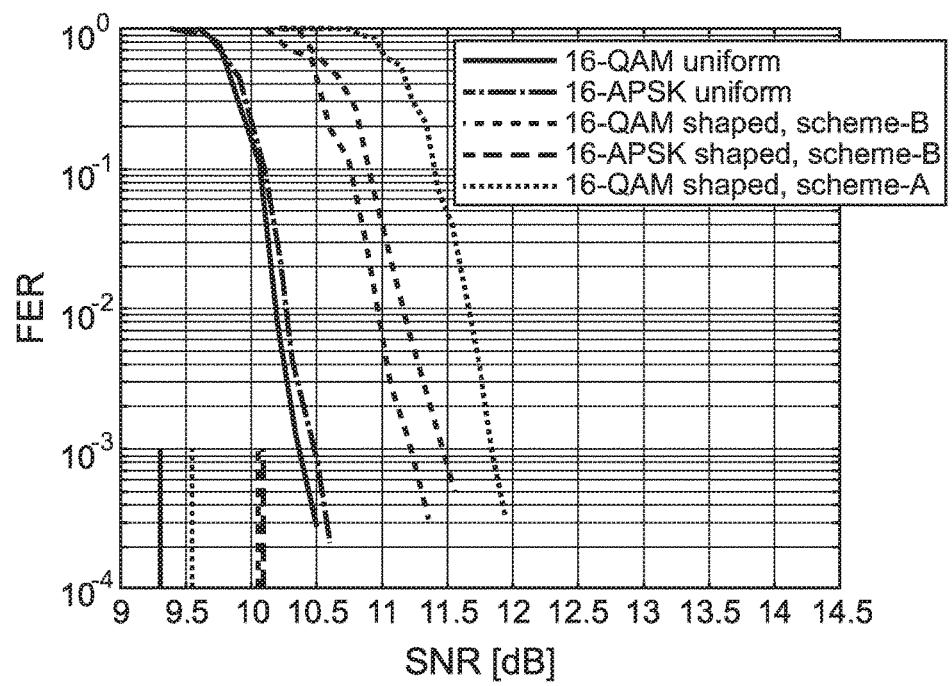
FIG. 8 is a simulation graph demonstrating FER to SNR curves for various constellations with and without the proposed technique.

FIG. 8 presents FER to SNR curves for rate 3 bits/symbol with roll-off 0.1 and Ks=6. The channel capacity for each transmission is represented by the vertical lines. All schemes used the same pragmatic binary TCM code with data length=4096 bits.

Figure 9:
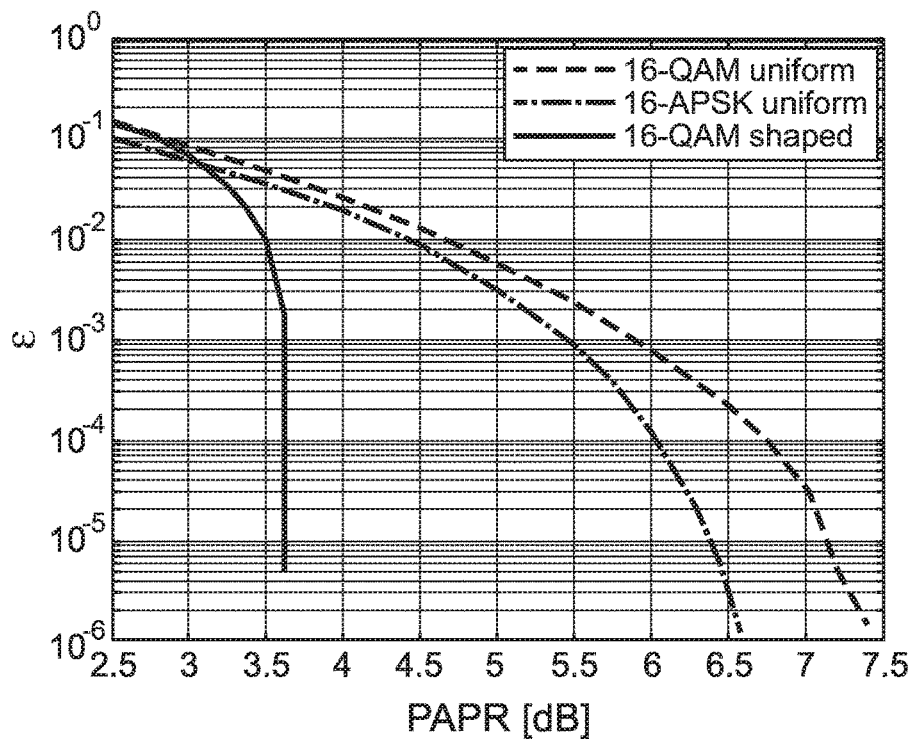
FIG. 9 is a simulation graph demonstrating PAPR comparison for various constellations with and without the proposed technique.

FIG. 9 presents PAPR comparison for rate 3 bits/symbol roll-off 0.1 and Ks=6. At crossover probability (denoted as) of 10-4 the shaped transmission has a gain of 3.1 dB and 2.4 dB over uniform 16-QAM and 16-APSK respectively.

With rate 2 bits/symbol we simulated the system with $K_s$=4 and roll-off 0.2. For a 8-PSK constellation, the maximal theoretical gain, which expected to be 1.1 dB, was obtained when constraining the peak value to 1.7, for both schemes. The shaped 8-PSK transmission was compared to uniform 8-PSK with the same pulse shape. The SNR at which FER $10^{-2}$ is reached, the PAPR corresponding to cross-over probability of $10^{-4}$ and the link gain compared with a uniform 8-PSK transmission with the same RRC filter as the shaped transmission are summarized in table IV. It can be seen that for scheme-B the shaped transmission achieves an overall link gain of 0.65 dB compared to uniform 8-PSK. Therefore, in this case there is a gap of 0.45 dB between the theoretical possible gain to the achieved gain by simulation.

TABLE IV

Rate 2 bits/symbol, RRC filter with Ks = 4 and roll-off 0.2, scheme-B FER, PAPR and link gain relative to 8-PSK constellation with uniform transmission summary.

| System | Capacity | SNR $10^{-2}$ | PAPR $10^{-4}$ | Link Gain |
|---|---|---|---|---|
| 8-PSK uniform | 5.76 dB | 6.62 dB | 4.14 dB | |
| 8-PSK, scheme-B | 6.3 dB | 7.66 dB | 2.45 dB | 0.65 dB |

In the case of rate 3 bits/symbol with roll-off 0.2 and $K_s$=4 the maximal theoretical gain is expected at peak constraints of 2.3 and 2 for a 16-QAM and 16-APSK constellations respectively. As shown in FIG. 5, for a shaped 16-QAM transmission, this gain is expected to be about 2.1 dB, compared to unshaped 16-QAM transmission, for both shaping schemes. For a shaped 16-APSK transmission according to scheme-B, this gain is expected to be about 2.36 dB compared to unshaped 16-QAM transmission. Those peak constraints was indeed found to achieve the highest link gain also in simulations. The shaped transmission is compared to non shaped 16-QAM and 16-APSK transmission with the same pulse shape. The resulting FER curves are presented in FIG. 10. The SNR at which FER $10^{-2}$ is reached, the PAPR corresponding to cross-over probability of $10^{-4}$ and the link gain compared with a uniform 16-QAM transmission with the same RRC filter as the shaped transmission are summarized in table V. For a shaped transmission over 16-QAM constellation, it can be seen that for scheme-A, the shaped transmission achieves an overall link gain of 0.73 dB compared to uniform 16-APSK transmission and 1.63 dB compared to uniform 16-QAM transmission. For scheme-B, the shaped 16-QAM transmission achieves an overall link gain of 1.03 dB compared to uniform 16-APSK transmission and 1.93 dB compared to uniform 16-QAM transmission. Comparing the $10^{-2}$ SNR to the capacity, it can be seen that the uniform transmission distance from capacity is about 0.9 dB and 0.96 dB for uniform 16-QAM and 16-APSK respectively, while the shaped 16-QAM transmission distance from capacity is 1.44 dB and 0.9 dB for scheme-A and scheme-B respectively. This indicates that scheme-A is suffered from a loss of about 0.53 dB. In scheme-B the additional loss is negligible. For a shaped transmission over 16-APSK constellation, it can be seen that scheme-B achieves an overall link gain of 1.41 dB and 2.31 dB compared to uniform 16-APSK and 16-QAM transmissions respectively. Comparing the 10-2 SNR to the capacity, it can been seen that the shaped 16 APSK transmission distance from capacity is 0.97 dB while the distance for a uniform 16-QAM transmission is 0.92 dB. Therefore, the additional shaping loss is negligible.

TABLE V

Rate 3 bits/symbol, RRC filter with Ks = 4 and roll-off 0.2, scheme-A and scheme-B FER, PAPR and link gain relative to 16-QAM constellation with uniform transmission summary.

| System | Capacity | SNR $10^{-2}$ | PAPR $10^{-4}$ | Link Gain |
|---|---|---|---|---|
| 16-QAM uniform | 9.3 dB | 10.22 dB | 6.11 dB | |
| 16-APSK uniform | 9.32 dB | 10.28 dB | 5.15 dB | |
| 16-QAM, scheme-A | 9.56 dB | 11 dB | 3.7 dB | 1.63 dB |
| 16-QAM, scheme-B | 9.7 dB | 10.6 dB | 3.8 dB | 1.93 dB |
| 16-APSK, scheme-B | 9.88 dB | 10.85 dB | 3.17 dB | 2.31 dB |

Figure 10:
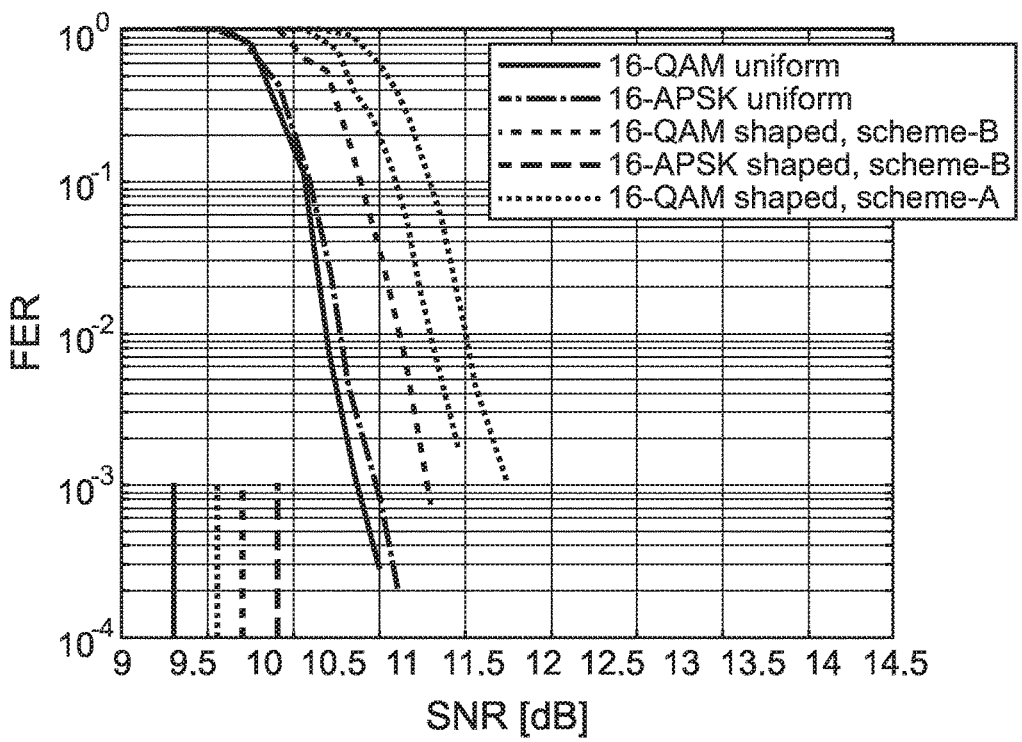
FIG. 10 is a simulation graph demonstrating FER to SNR curves for other constellations with and without the proposed technique.

FIG. 10 presents FER to SNR curves for rate 3 bits/symbol with roll-off 0.2 and Ks=4. The channel capacity for each transmission represented by the vertical lines. All schemes used the same pragmatic binary TCM code with data length=4096 bits.

It could be noted that for both presented RRC pulse shape combinations, scheme-A suffers from higher SNR loss against scheme-B. Since the PAPR gain for both schemes is approximately the same, the simulated link gain in scheme-B is higher. However, the theoretical possible link gain in scheme-B is lower than scheme-A because quantization B is sub-optimal.

As discussed in section IV-E, in order to combine a transmission with high spectral efficiency with this PAPR reduction algorithm, the actual RRC filter span must be higher than $K_s$=6. For keeping the peaks after the RRC filter in the specified range, the signal is clipped when it exceeds from the maximum peak constraint. Hence, the actual simulated RRC filter span is $K_s$=20 but the algorithm optimization was made for RRC filter with $K_s$=6. The RRC filter roll-off is 0.1 and the transmission rate is 3 bits/symbol, thus, in order to maximize the link gain, the chosen peak constraints for 16-QAM and 16-APSK constellations are 2.2 and 2.1 respectively. The total shaped transmission, with scheme-B, is compared to non shaped 16-QAM transmission with the same pulse shape (with span of $K_s$=20 and roll-off 0.1). The resulting FER curves for a shaped 16-QAM transmission are presented in FIG. 11. The SNR at which FER $10^{-2}$ is reached, the PAPR corresponding to cross-over probability of $10^{-4}$ and the link gain compared with a uniform 16-QAM transmission with the same RRC filter as the shaped transmission are summarized in table VI. It can be seen that the clipping is not adding loss to the system and the total SNR loss for 16-QAM and 16-APSK constellations is 0.78 dB and 0.93 dB respectively. Since that the PAPR gains for shaped 16-QAM and 16-APSK are 3.2 dB and 3.6 dB respectively, the total shaped 16-QAM and 16-APSK transmissions achieves an overall link gain of 2.4 dB and 2.67 dB respectively compared to uniform 16-QAM transmission.

Figure 12:
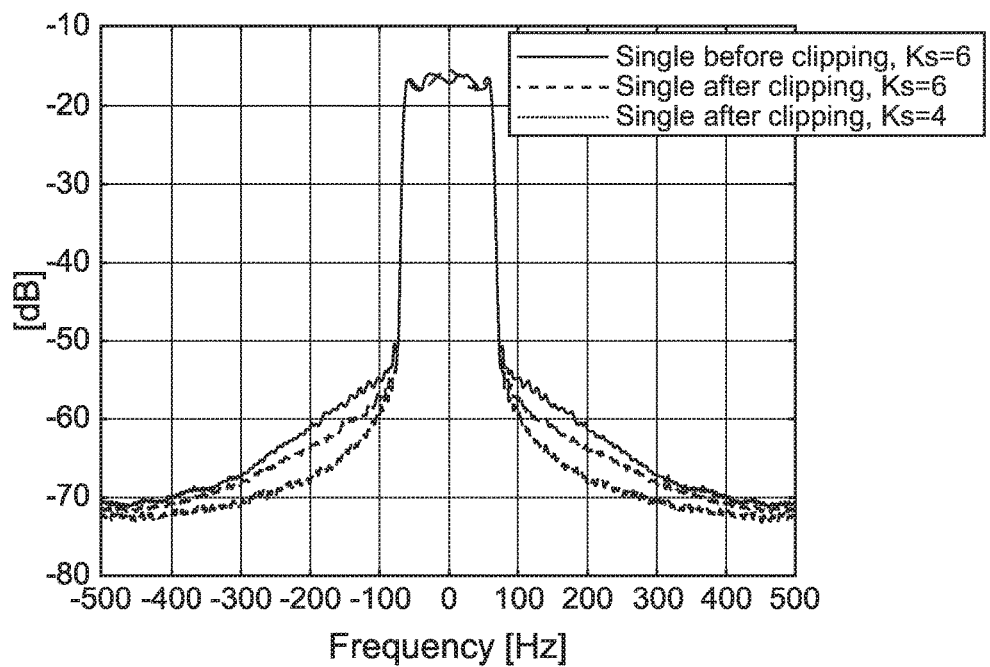
FIG. 12 is a PSD comparison between the shaped signal versus the shaped & clipped signal.

Since that the signal after the RRC filter is clipped, the spectrum of the signal may change, therefore, the spectrum of the signal must be checked. FIG. 12 show a comparison between the power spectral density (PSD) of the shaped signal before clipping and after clipping. It can be seen that as the RRC filter span that was optimized is larger, the clipping influence on the signal spectrum becoming smaller. This is because that as the optimized filter span is closer to the simulated filter span, much less power samples exceed the peak constraint after the filter. Hence, the limiter need to deal with much less power peaks compared to a system with the same peak constraint and without shaping or with lower optimized filter span. If additional filtering will be done after clipping then there will be no change in PSD at all.

TABLE VI

Rate 3 bits/symbol, RRC filter with Ks = 20 and roll-off 0.1, Scheme-B + clipping system FER, PAPR and link gain relative to 16-QAM constellation with uniform transmission summary.

| System | Capacity | SNR $10^{-2}$ | PAPR $10^{-4}$ | Link Gain |
|---|---|---|---|---|
| 16-QAM uniform | 9.3 dB | 10.22 dB | 6.9 dB | |
| 16-QAM, scheme-B + clipping | 10.05 dB | 11 dB | 3.7 dB | 2.4 dB |
| 16-APSK, scheme-B + clipping | 10.09 dB | 11.15 dB | 3.3 dB | 2.67 dB |

Figure 11:
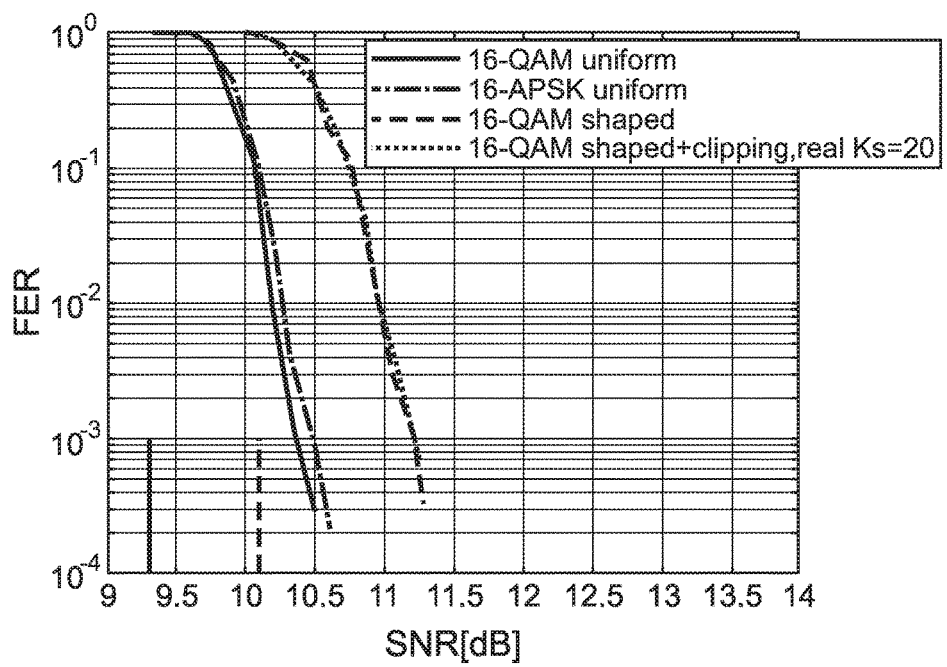
FIG. 11 is a simulation graph demonstrating FER to SNR curves for yet other constellations, and with clipping, with and without the proposed technique.

FIG. 11 presents FER to SNR curves for rate 3 bits/symbol with roll-off 0.1 and Ks=6 compared to Ks=20+ clipping. The channel capacity for each transmission represented by the vertical lines. All schemes used the same pragmatic binary TCM code with data length=4096 bits. The SNR loss of the both shaped transmission is 0.78 dB compared to uniform 16-QAM.

FIG. 12 presents PSD comparison between the shaped signal to shaped+clipped signal. The shaped signals are optimize for a 16-QAM system with RRC filter spans of Ks=6 and Ks=4 and roll-off 0.1. The real simulated RRC filter span is 20 with the same roll-off.

The novel technique for reducing the PAPR may be implemented for a single carrier transmission with high spectral efficiency. The main cost of this technique is a certain loss of SNR and an additional BCJR decoder (a decoder for convolutional codes) which replaces a simpler de-mapper module.

However, this technique allows for SNR loss to PAPR gain tradeoff by choosing different peak power values to be avoided. It was shown to operate well with modern ECC scheme, namely turbo codes, and reduce the PAPR of the transmission signal such that an overall gain is achieved compared to uniform transmission. In rate of 3 bits/symbol when using a 16-QAM and 16-APSK constellations, this gain was demonstrated to be up to 2.4 dB and 2.67 dB respectively, compared to a uniform transmission of 16-QAM constellation.

It should be appreciated that the invention has been described with reference to specific examples, versions of the method and embodiments of the system, while other examples, versions and embodiments may be proposed and should be considered part of the present invention whenever defined by the claims which follow.

REFERENCES

[1] Rha, P. S.; Hsu, S., "Peak-to-average ratio (PAR) reduction by pulse shaping using a new family of generalized raised cosine filters", IEEE 58th Vehicular Technology Conference, vol. 1, pp. 706-710, 2003.

[2] Li. C, Jiang. T, Zhou. Y and Li. H, "A Novel Constellation Reshaping Method for PAPR Reduction of OFDM Signals", IEEE Transactions on Signal Processing, vol. 59, no. 6, pp. 2710-2719, June 2011.

[3] D. Qu, L. Li and T. Jiang, "Invertible Subset LDPC Code For PAPR Reduction In OFDM Systems With Low Complexity. IEEE Transactions on Wireless Communications", IEEE Transactions on Wireless Communications, vol. 13, no. 4, pp. 2204-2213, April 2014.

[4] Chatelain, B.; Gagnon, F., "Peak-to-average power ratio and intersymbol interference reduction by Nyquist pulse optimiza-tion", IEEE 60th Vehicular Technology Conference, vol. 2, pp. 954-958, 2004.

[5] Miller, S. L. and O'Dea, R. J., "Peak power and bandwidth efficient linear modulation", IEEE Transactions on Communica-tions, vol. 46, No. 12, pp. 1639-1648, 1998.

[6] Tomlinson, M.; Ambroze, M.; Wade, G., "Power and bandwidth efficient modulation and coding for small satellite communication terminals", IEEE International Conference on Communications, vol. 5, pp. 2943-2946, 2002.

[7] Tomlinson, M.; Ambroze, M.; Wade, G., "Magnitude modulation for small satellite Earth terminals using QPSK and OQPSK", IEEE International Conference on Communications, vol. 3, pp. 2099-2103, 2003.

[8] Gomes, M.; Cercas, F.; Silva, V.; Tomlinson, M., "Polyphase magnitude modulation for peak power control", 17th European Signal Processing Conference, 1151-1155, 2009.

[9] Gomes, M., Cercas, F., Silva, V. and Tomlinson, Martin, "Magnitude modulation for VSAT's low back-off transmission", Journal of Communications and Networks, vol. 12, No. 6, pp. 544-557, 2010.

[10] Chen, Mei and Collins, O. M., "Trellis pruning for peak-to-average power ratio reduction", International Symposium on Information Theory, 2005. ISIT 2005., pp. 1261-1265, 2005.

[11] G. D. Forney, Jr., "Trellis Shaping", IEEE Trans. Inf. Theory, vol. 38, No. 2, pp. 281-300, March 1992.

[12] Litzenburger, M.; Rupprecht, W., "Combined trellis shaping and coding to control the envelope of a bandlimited PSK-signal", IEEE International Conference on Communications, pp. 630-634, March 1994.

[13] Tanahashi, M.; Ochiai, H, "Near constant envelope trellis shaping for PSK signaling", IEEE Transactions on Communi-cations, vol. 57, no. 2, pp. 450-458, 2009.

[14] Tanahashi, M.; Ochiai, H, "Trellis Shaping for Controlling Envelope of Single-Carrier High-Order QAM Signals", IEEE Journal of Selected Topics in Signal Processing, vol. 3, no.3, pp. 430-437, 2009.

[15] Fischer, R. F. H.; Gerstacker, W. H.; Huber, J. B., "Dynamics limited precoding, shaping, and blind equalization for fast digital transmission over twisted pair lines", IEEE Journal of Selected Areas in Communications, vol. 13, no.9, pp. 1622-1633, 1995.

[16] Fischer, R. F. H.; Tzschoppe, R.; Huber, J. B., "Signal shaping for peak-power and dynamics reduction in transmission schemes employing precoding", IEEE Transactions in Communications, vol. 50, no.5, pp. 735-741, 2002.

[17] Tanahashi, M. and Ochiai, H., "Turbo decoding of concatenated channel coding and trellis shaping for peak power controlled single-carrier systems", IEEE Transactions on Communications, vol. 58, pp. 9-15, January 2010.

[18] Shilpa, G. and Thangaraj, A. and Bhashyam, S., "Dirty paper coding using sign-bit shaping and LDPC codes", Proceedings (ISIT), 2010 IEEE International Symposium on Information Theory, pp. 923-927, June 2010.

[19] Csiszar, I. and Cover, T. M. and Byoung-Seon Choi, "Conditional limit theorems under Markov conditioning", IEEE Transactions on Information Theory, vol. 33, pp. 788-801, November 1987.

[20] Arnold, D. M.; Loeliger, H.-A.; Vontobel, P. O.; Kavcic, A.; Wei Zeng, "Simulation-Based Computation of Information Rates for Channels with Memory", IEEE Transactions on information theory, vol. 52, pp 3498-3508, August 2006.

[21] D. Raphaeli and A. Gurevitz, "Constellation Shaping for Pragmatic Turbo-Coded Modulation With High Spectral Efficiency", IEEE Trans. Commun., vol. 52, pp. 341-345, March 2004.

[22] Bahl, L. and Cocke, J. and Jelinek, F. and Raviv, J., "Optimal decoding of linear codes for minimizing symbol error rate", IEEE Transactions on Information Theory, March 1974, pp. 284-287.

[23] V. Franz and J. Anderson, "Concatenated decoding with a reduced-search BCJR algorithm", IEEE Journal on Selected Areas in Communications, vol. 16, no. 2, pp. 186-195, 1998.

[24] S. Le Goff, A. Glavieux, and C. Berrou, "Turbo codes and high-efficiency modulation", Proc. IEEE Int. Conf. Communications, New Orleans, La., May 1994, pp. 645-649.

[25] C. Berrou, A. Glavieux, and P. Thitimajshima, "Near-optimum error-correcting coding and decoding: Turbo codes", IEEE Trans. Commun., vol. 44, pp. 1261-1271, October 1996.

[26] S. Benedetto, R. Garello, and G. Montorsi, "A search for good convolutional codes to be used in the construction of turbo codes", IEEE Trans. Commun., vol. 46, pp. 1101-1105, September 1998.

The invention claimed is:

1. A method of mapping suitable for Peak to Average Power Ratio (PAPR) reduction while transmitting data portions via a communication channel limited by a peak power $p_{peak}$ constraint,
the mapping being performed by using a pulse shape filter with duration spanning over $K_s$ symbols, and
a mapper configured to utilize a Markovian symbol transition probability distribution with quantized probabilities and to select, for a specific data portion at a current channel state, such a binary symbol, called thinned label,
wherein:
said Markovian distribution is based on a System model according to which the current channel state at time k, denoted $s_k$, comprises a $K_{s-1}$ symbols sequence $(c_{k-K_{s+1}}, \ldots, c_{k-1})$, a combination of the channel state sk and a symbol ck determines the next channel state $s_{k+1}$;
the mapping utilizing said Markovian distribution comprises successively mapping the data portions into binary symbols in a manner that
a current binary symbol depends on said current channel state,
use of binary symbols, supposed to produce peak values exceeding the $p_{peak}$ constraint, is avoided,
each binary symbol is expected to be used with its specific transition probability at the current channel state,
the Markovian distribution is quantized by forming at least one group of close transition probabilities and assigning to said group a common binary symbol and a rounded group probability, thus obtaining a non-uniform symbol distribution where the binary symbols, including said common binary symbol, are expected to be used with different transition probabilities;
said common binary symbol is replaced with said selected thinned label being a binary symbol comprising non-transmittable bits;
said thinned label thereby enables reduction of peak power produced by said label if transmitted, by allowing to puncture one or more bits in the thinned label's bit sequence before transmission,
the mapping thereby ensures reduction of peak values produced by said binary symbols, including said thinned label whenever selected for transmission, thus contributing to PAPR reduction.

2. The method according to claim 1, implemented by using a channel-state dependent mapping table comprising, for each current channel state, quantized values of probabilities of the current channel state to become $s_k$, given that the current state is $s_{k-1}$.

3. The method according to claim 1, wherein the mapping terminates with selecting, for a current data portion, a binary symbol or the thinned label assigned to the highest transition probability for a current channel state.

4. The method according to claim 1, wherein all transition probabilities assigned for the current channel state form 1 in sum and each of them is quantized to $2^{-b}$, where b is a natural number of non-puncturable bits of the selected symbol for said specific probability.

5. The method according to claim 1, comprising updating the current channel state by the selected binary symbol.

6. The method of claim 1, wherein said at least one group is the group of higher transition probabilities.

7. The method according to claim 1, comprising building a mapping table for a current channel state by:
applying said System model to possible binary combinations of the data portions at the current data state, to obtain the Markovian distribution of the binary symbols and their transition probabilities with constraint $p_{peak}$, thereby addressing said binary combinations by assigning to them symbols with transition probabilities in the manner that the symbols producing lower peak values have higher transition probabilities, while the symbols producing higher peak values have lower transition probabilities,
quantizing the Markovian distribution by grouping the obtained transition probabilities by value so as to form said at least one group as a group of higher transition probabilities comprising two or more members, and assigning to each of said groups a specific common symbol and a specific rounded probability of the group,
selecting for each of said groups, a specific said thinned label for replacing/labeling said specific common symbol, said thinned label being close to the binary combinations addressed by said group but producing a peak value equal to or lower than any of said binary combinations.

8. The method according to claim 1, followed by transmitting the thinned label, selected for said data portions, upon puncturing its said one or more bits, called non-transmittable bits, by a puncturing unit, thereby reducing the peak value produced in the transmission and thus contributing to PAPR reduction.

9. The method according to claim 1, wherein said one or more bits of the thinned label, called non-transmittable bits, are error-correcting bits in a data portion.

10. The method of claim 1, wherein the mapping is performed depending on a type of bits in the data portion and/or depending whether the symbol forbidden or not for transmission.

11. The method according to claim 8, comprising de-mapping of the transmitted symbol, at a receiver end of the communication channel, using a de-mapper capable of applying the Markovian distribution and capable of recovering the binary value of the punctured bits.

12. The method according to claim 1, comprising preliminary steps of:
adding error correction redundancy/parity bits to information bits, thereby creating at least one code word, and
dividing each code word into shorter said data portions, each portion having its specific binary combination.

13. The method according to claim 1, wherein to further minimize peak power $p_{peak}$, the mapping step is performed as close as possible to Gray-code based bit labelling.

14. The method according to claim 1, wherein for close channel states differing by one symbol, the mapping thereof is performed by selecting binary symbols that are as close as possible to one another.

15. A system for mapping data portions for transmission via a communication channel with a peak power $p_{peak}$ constraint, the system comprising a pulse shape filter with duration spanning over $K_s$ symbols a mapper being configured to utilize a Markovian symbol transition probability distribution with quantized probabilities;
the mapper being adapted to select, for a specific data portion at a current channel state, a binary symbol called "thinned label" supposed to reduce peak power by allowing to puncture/omit one or more bits in the thinned label's bit sequence before transmission,
wherein:
said Markovian distribution is based on a System model according to which the current channel state at time k, denoted $s_k$, comprises a $K_s-1$ symbols sequence ($c_{k-Ks+1}, \ldots, c_{k-1}$), a combination of the channel state $s_k$ and a symbol $c_k$ determines the next channel state $s_{k+1}$;
for utilizing said Markovian distribution, the mapper is adapted to successively map the data portions into binary symbols in a manner that
a current binary symbol depends on said current channel state,
use of binary symbols, supposed to produce peak values exceeding the ppeak constraint, is avoided,
each binary symbol is expected to be used with its specific transition probability at the current channel state,
the Markovian distribution is quantized by forming at least one group of close transition probabilities and assigning to said group a common binary symbol and a rounded group probability, thus obtaining a non-uniform symbol distribution where the binary symbols, including said common binary symbol, are expected to be used with different transition probabilities;
said common binary symbol is replaced with said selected thinned label being a binary symbol comprising non-transmittable bits; and
the mapper thereby ensures reduction of peak values produced by said binary symbols, including said thinned label whenever selected for transmission, thus contributing to PAPR reduction.

16. The system according to claim 15, further comprising a bit puncturing device for puncturing the non-transmittable bits of the thinned label at a transmitter side of the communication channel before transmission, and a de-mapper at a receiver side of the communication channel, capable of demapping the punctured transmitted thinned label.

17. The system according to claim 16, further comprising an ECC encoder at the transmitter side of the communication channel, and an ECC decoder at the receiver side of the communication channel, wherein the demapper being configured to utilize in its operation the same Markovian distribution with the same constraint, and the same ECC as applied at the transmitter side of the communication channel.

18. A mapper suitable for mapping data portions to be transmitted via a communication channel limited by a peak power $p_{peak}$ constraint,
the mapper being configured to utilize a Markovian symbol transition probability distribution with quantized probabilities;
the mapper being adapted to select, for a specific data portion at a current channel state, a binary symbol, called thinned label, wherein said current channel state comprises a number of consequently transmitted previous symbols terminating with the last transmitted symbol;

for utilizing said Markovian distribution, the mapper being operative to successively map the data portions into binary symbols in a manner that a current binary symbol depends on said current channel state, use of binary symbols, supposed to produce peak values exceeding the ppeak constraint, is avoided, each binary symbol is expected to be used with its specific transition probability at the current channel state, the Markovian distribution is quantized by forming at least one group of close transition probabilities and assigning to said group a common binary symbol and a rounded group probability, thus obtaining a non-uniform symbol distribution where the binary symbols, including said common binary symbol, are expected to be used with different transition probabilities;

said common binary symbol is replaced with said selected thinned label being a binary symbol comprising one or more non-transmittable bits and being supposed to reduce peak power ppeak by allowing to puncture said one or more bits in the thinned label's bit sequence before transmission;

the mapper further comprising a puncturing unit for puncturing said one or more non-transmittable bits in the selected thinned label in order to reduce the peak value produced in the transmission and thus contributing to PAPR reduction.

19. The mapper according to claim 18, further adapted to select said thinned label for the maximal transition probability quantized for said specific data portion in the symbol transition probability distribution at the current channel state.

20. A software product comprising computer implementable instructions and/or data for carrying out the method according to claim 1, stored on an appropriate non-transitory computer readable storage medium so that the software product is capable of enabling operations of said method when used in a computer system.

21. The mapper according to claim 18, wherein said Markovian symbol transition probability distribution P* utilized by the mapper is defined by:

$$P^*(s_k, s_{k-1}) = \begin{cases} \lambda^{-1} u(s_{k-1}) W(s_k \mid s_{k-1}) v(s_k) & (s_k, s_{k-1}) \in E \\ 0 & (s_k, s_{k-1}) \notin E \end{cases} \quad (3)$$

where

W $(s_k|s_{k-1})$ is a Markov representation of uniform transmission, given by $$W_{(s_k|s_{k-1})} = \begin{cases} 1/M & \text{if } (s_k, s_{k-1}) \in E_0 \\ 0 & \text{if } (s_k, s_{k-1}) \notin E_0 \end{cases}$$

E is the subset of $E_0$ of all consecutive channel states $s_k$, $s_{k-1}$ for which peak power, resulting from combination of channel state $s_{k-1}$ and a mapped data portion causing channel state $s_k$, do not exceed ppeak, $\lambda$ is the largest eigenvalue of the matrix obtained from W by replacing the entries $(s_k, s_{k-1}) \in /E$ by zeros, and u and v are the corresponding left and right eigenvectors.

* * * * *